(12) United States Patent
Tieu

(10) Patent No.: US 12,125,500 B2
(45) Date of Patent: Oct. 22, 2024

(54) MAINTAINING CONSISTENT LOCATION FOR SPINDLE INTERRUPTS WHEN SPINDLE MOTOR SWITCHES MODES

(71) Applicant: Western Digital Technologies, Inc., San Jose, CA (US)

(72) Inventor: Triet Tieu, Milipitas, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/448,007

(22) Filed: Aug. 10, 2023

(65) Prior Publication Data

US 2024/0249748 A1 Jul. 25, 2024

Related U.S. Application Data

(60) Provisional application No. 63/440,990, filed on Jan. 25, 2023.

(51) Int. Cl.
| | | |
|---|---|---|
| *G11B 19/28* | (2006.01) | |
| *G11B 19/02* | (2006.01) | |
| *G11B 19/20* | (2006.01) | |

(52) U.S. Cl.
CPC ............ *G11B 19/28* (2013.01); *G11B 19/02* (2013.01)

(58) Field of Classification Search
CPC ..... G11B 5/5548; G11B 5/5565; G11B 15/44; G11B 15/442; G11B 19/20; G11B 19/2009; G11B 19/00; G11B 15/00; G11B 5/55; G11B 5/5521; G11B 5/5547
USPC ................................................ 360/75, 78.13
See application file for complete search history.

(56) References Cited

U.S. PATENT DOCUMENTS

| | | |
|---|---|---|
| 5,345,347 A | 9/1994 | Hopkins et al. |
| 5,466,999 A | 11/1995 | Hutsell |
| 5,471,353 A | 11/1995 | Codilian et al. |
| 6,534,936 B2 | 3/2003 | Messenger et al. |
| 6,914,740 B1 | 7/2005 | Tu et al. |
| 7,355,939 B2 | 4/2008 | Wu et al. |
| 9,230,593 B1 * | 1/2016 | Nicholls ............... G11B 19/20 |

(Continued)

FOREIGN PATENT DOCUMENTS

JP 2003281813 A 10/2003

OTHER PUBLICATIONS

Fujitsu, "Disk Drives Product Manual", Jan. 1997, p. 176.

(Continued)

*Primary Examiner* — Nabil Z Hindi
(74) *Attorney, Agent, or Firm* — Neugeboren O'Dowd PC

(57) ABSTRACT

Various illustrative aspects are directed to a data storage device comprising one or more disks; a spindle motor for rotating the one or more disks, wherein the spindle motor comprises a plurality of magnetic pole-pairs, and wherein the spindle motor is configured to operate in a plurality of modes, including at least a first mode and a second mode; and one or more processing devices configured to select a reference point for spindle motor interrupt service routines (ISRs), determine a delay time, wherein the delay time is based at least in part on a number of magnetic pole-pairs and a mechanical revolution period of the spindle motor, start a timer at a first ISR, and when the timer is equal to the delay time, switch operation of the spindle motor from the first mode to the second mode.

22 Claims, 16 Drawing Sheets

(56) References Cited

U.S. PATENT DOCUMENTS

2002/0159184 A1   10/2002   Shigematsu
2006/0066280 A1   3/2006    Bhaumik et al.

OTHER PUBLICATIONS

Jiang et al., "A New Phase-Delay-Free Method To Detect Back EMF Zero-Crossing Points for Sensorless Control of Spindle Motors", IEEE Transactions on Magnetics, Jul. 2005, pp. 2287-2294, vol. 41, No. 7.

* cited by examiner

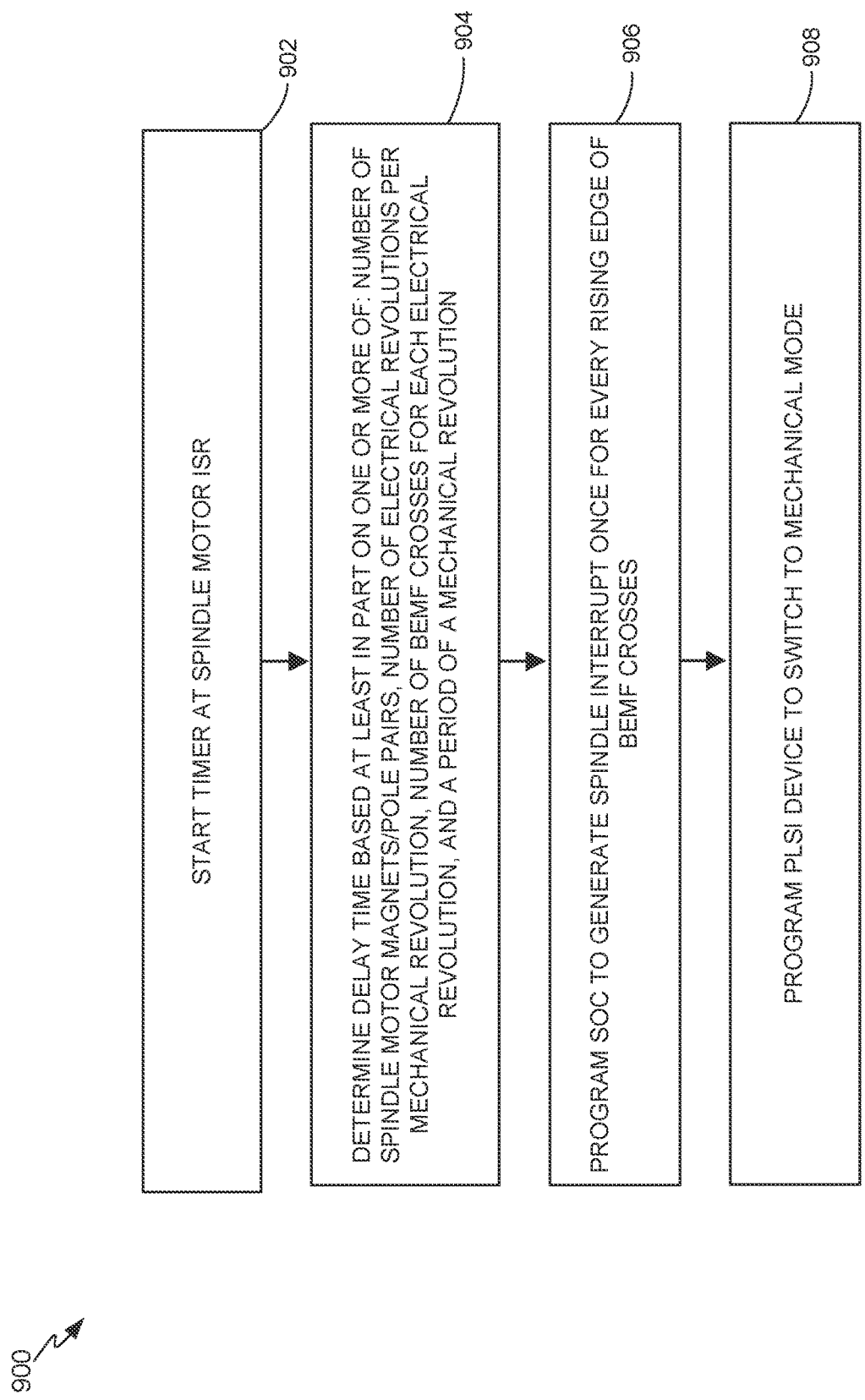

MAINTAINING CONSISTENT LOCATION FOR SPINDLE INTERRUPTS WHEN SPINDLE MOTOR SWITCHES MODES

CLAIM OF PRIORITY UNDER 35 U.S.C. § 120

The present Application for Patent claims priority to Provisional Application No. 63/440,990 entitled "MAINTAINING CONSISTENT LOCATION FOR SPINDLE INTERRUPTS WHEN SPINDLE MOTOR SWITCHES MODES" filed Jan. 25, 2023, and assigned to the assignee hereof and hereby expressly incorporated by reference herein.

BACKGROUND

Data storage devices such as disk drives comprise one or more disks, and one or more read/write heads connected to distal ends of actuator arms, which are rotated by actuators (e.g., a voice coil motor, one or more fine actuators) to position the heads radially over surfaces of the disks, at carefully controlled fly heights over the disk surfaces. The disk surfaces each comprise a plurality of radially spaced, concentric tracks for recording user data sectors and servo wedges or servo sectors. The servo tracks are written on previously blank disk drive surfaces as part of the final stage of preparation of the disk drive. The servo sectors comprise head positioning information (e.g., a track address) which is read by the heads and processed by a servo control system to control the actuator arms as they seek from track to track.

FIG. 1 shows a prior art disk format 2 as comprising a number of radially-spaced, concentric servo tracks 4 defined by servo wedges 60-6N recorded around the circumference of each servo track. A plurality of concentric data tracks are defined relative to the servo tracks 4, wherein the data tracks may have the same or a different radial density (e.g., tracks per inch (TPI)) than the servo tracks 6. Each servo wedge 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge 64) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to the one or more actuators in order to actuate the head radially over the disk in a direction that reduces the PES.

The description provided in the background section should not be assumed to be prior art merely because it is mentioned in or associated with the background section. The background section may include information that describes one or more aspects of the subject technology.

SUMMARY

The following presents a summary relating to one or more aspects and/or embodiments disclosed herein. The following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Spindle motors in hard disk drives (HDDs) can operate in a variety of modes, such as mechanical window mode, electrical mode (e.g., electrical single edge, electrical multiple edge), and/or mechanical windowless mode. In some circumstances, spindle interrupts are used to update the spindle digital to analog converter (DAC) to compensate for error in motor speed. In this way, spindle interrupts help regulate speed of the spindle motor. In some cases, the spindle motor may need to change spindle mode depending on the task. For example, some tasks that require high frequency input may require the spindle motor to operate in the electrical mode (e.g., single edge or multiple edge). In other cases, the spindle motor is operated in the mechanical mode, for instance, for tasks requiring low frequency input. Typically, the location where the spindle interrupt occurs is referenced to a zero cross location where one of the spindle phases crosses the zero point. Ideally, the spindle interrupt should occur at the same location when the spindle switches mode (e.g., from mechanical to one of the electrical modes, or vice versa). In some circumstances, however, the spindle motor may move with respect to the location where the control circuitry (or firmware) decided to switch the mode. That is, there is a discrepancy between the location where the control circuitry (or FW) intended to change the mode and the actual motor location where the switch occurred. In some instances, this discrepancy may lead to synchronization issues, where the information on the disk before and after the mode switch is not consistent.

Broadly, aspects of the present disclosure are directed to techniques for helping maintain consistent motor location for spindle interrupts when the spindle motor changes modes.

Various illustrative aspects are directed to a data storage device comprising one or more disks; a spindle motor for rotating the one or more disks, wherein the spindle motor comprises a plurality of magnetic pole-pairs, and wherein the spindle motor is configured to operate in a plurality of modes, including at least a first mode and a second mode; and one or more processing devices configured to select a reference point for spindle motor interrupt service routines (ISRs), determine a delay time, wherein the delay time is based at least in part on a number of magnetic pole-pairs and a mechanical revolution period of the spindle motor, start a timer at a first ISR, and when the timer is equal to the delay time, switch operation of the spindle motor from the first mode to the second mode.

In some implementations of the data storage device, the first ISR occurs at the reference point.

In some implementations of the data storage device, switching operation of the spindle motor from the first mode to the second mode comprises programming a power large scale integrated (PLSI) circuit to switch operation prior to a second, adjacent ISR.

In some implementations of the data storage device, a time span between spindle motor ISRs, including at least the first ISR and the second, adjacent ISR is equal to or substantially equal to the mechanical revolution period.

In some implementations of the data storage device, the delay time is a function of the number of magnetic pole-pairs of the spindle motor and the mechanical revolution period.

In some implementations of the data storage device, the reference point is selected to coincide with one magnetic pole pair of the plurality of magnetic pole pairs.

In some implementations of the data storage device, the first mode comprises one of a mechanical mode and an electrical mode, and the second mode comprises another of the mechanical mode and the electrical mode, wherein the mechanical mode is selected from a group consisting of a mechanical window mode and a mechanical windowless mode, and wherein the electrical mode is selected from a group consisting of an electrical single edge mode and an electrical multiple edge mode.

Various illustrative aspects are directed to a data storage device comprising one or more disks; a spindle motor for rotating the one or more disks, wherein the spindle motor comprises a plurality of magnetic pole-pairs, each magnetic pole pair corresponding to one electrical revolution, and wherein the spindle motor is configured to operate in a plurality of modes, including at least a first mode and a second mode, wherein the first mode is associated with a first number of back electromotive force (BEMF) windows for each spindle interrupt, and wherein the second mode is associated with a second number of BEMF windows for each spindle interrupt; and one or more processing devices configured to select a reference point for spindle motor interrupt service routines (ISRs), determine a target number of BEMF windows, wherein determining the target number of BEMF windows is based at least in part on one or more of the first number of BEMF windows and a number of magnetic pole-pairs, start a timer at a first ISR, increment, for each BEMF window detected, the counter, and when the counter is equal to the target number of BEMF windows, switch operation of the spindle motor from the first mode to the second mode.

In some implementations of the data storage device, the first mode comprises one of a mechanical mode and an electrical mode, and the second mode comprises another of the mechanical mode and the electrical mode, wherein the electrical mode comprises one of an electrical single edge mode and an electrical multiple edge mode.

In some implementations of the data storage device, when one of the first mode and the second mode comprises an electrical mode, each electrical revolution comprises one or more BEMF windows.

In some implementations of the data storage device, switching operation of the spindle motor from the first mode to the second mode further comprises generating a second ISR at the reference point, determining the second number of BEMF windows for each spindle interrupt when the spindle motor is operating in the second mode, and updating a System on Chip (SoC) to periodically generate one or more subsequent spindle motor ISRs, including at least a third ISR, wherein each of the one or more subsequent spindle motor ISRs is generated at or when the second number of BEMF windows have been crossed.

In some implementations of the data storage device, switching operation of the spindle motor from the first mode to the second mode comprises programming a power large scale integrated (PLSI) circuit to switch operation prior to the second ISR.

In some implementations of the data storage device, a time span between spindle motor ISRs, including at least a first time span between the first ISR and the second ISR, and the first time span between the second ISR and the third ISR is equal to or substantially equal to a mechanical revolution period.

In some implementations of the data storage device, the target number of BEMF windows=[(number of magnetic pole-pairs−1)*(number of BEMF windows for each electrical revolution)].

In some implementations of the data storage device, the reference point is selected to coincide with one magnetic pole-pair of the plurality of magnetic pole-pairs, wherein each electrical revolution spans between two adjacent magnetic pole-pairs of the plurality of magnetic pole-pairs.

Various illustrative aspects are directed to a method of operating a data storage device, the method comprising selecting a reference point for interrupt service routines (ISRs) for a spindle motor of the data storage device, wherein the spindle motor comprises a plurality of magnetic pole-pairs, and wherein the spindle motor is configured to operate in a plurality of modes, including at least a first mode and a second mode; determining a delay time, wherein the delay time is based at least in part on a number of magnetic pole-pairs and a mechanical revolution period of the spindle motor; starting a timer at a first ISR; and when the timer is equal to the delay time, switching operation of the spindle motor from the first mode to the second mode.

In some implementations of the method, the first ISR occurs at the reference point. In some implementations of the method, switching operation of the spindle motor from the first mode to the second mode comprises programming a power large scale integrated (PLSI) circuit to switch operation prior to a second, adjacent ISR. In some implementations of the method, a time span between spindle motor ISRs, including at least the first ISR and the second, adjacent ISR is equal to or substantially equal to the mechanical revolution period.

In some implementations of the method, the delay time is a function of the number of magnetic pole-pairs of the spindle motor and the mechanical revolution period. In some implementations of the method, the reference point is selected to coincide with one magnetic pole pair of the plurality of magnetic pole pairs.

In some implementations of the method, the first mode comprises one of a mechanical mode and an electrical mode, and the second mode comprises another of the mechanical mode and the electrical mode, wherein the mechanical mode is selected from a group consisting of a mechanical window mode and a mechanical windowless mode, and wherein the electrical mode is selected from a group consisting of an electrical single edge mode and an electrical multiple edge mode.

Various illustrative aspects are directed to a method of operating a data storage device, the method comprising selecting a reference point for interrupt service routines (ISRs) for a spindle motor of the data storage device, wherein the spindle motor comprises a plurality of magnetic pole-pairs, each magnetic pole pair corresponding to one electrical revolution, and wherein the spindle motor is configured to operate in a plurality of modes, including at least a first mode and a second mode, wherein the first mode is associated with a first number of back electromotive force (BEMF) windows for each spindle interrupt, and wherein the second mode is associated with a second number of BEMF windows for each spindle interrupt, determining a target number of BEMF windows, wherein determining the target number of BEMF windows is based at least in part on one or more of the first number of BEMF windows and a number of magnetic pole-pairs, starting a counter at a first ISR, incrementing, for each BEMF window detected, the counter, and when the counter is equal to the target number of BEMF windows, switching operation of the spindle motor from the first mode to the second mode.

In some implementations of the method, the first mode comprises one of a mechanical mode and an electrical mode, and the second mode comprises another of the mechanical mode and the electrical mode, wherein the electrical mode comprises one of an electrical single edge mode and an electrical multiple edge mode.

In some implementations of the method, when one of the first mode and the second mode comprises an electrical mode, each electrical revolution comprises one or more BEMF windows.

Various further aspects are depicted in the accompanying figures and described below and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure and are not limiting in scope.

FIG. 9 illustrates an example of a method for switching synchronously from an electrical single-phase mode to a mechanical mode based on calculating a delay time, according to various aspects of the disclosure.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The embodiments described below are not intended to limit the disclosure to the precise form disclosed, nor are they intended to be exhaustive. Rather, the embodiment is presented to provide a description so that others skilled in the art may utilize its teachings. Technology continues to develop, and elements of the described and disclosed embodiments may be replaced by improved and enhanced items, however the teaching of the present disclosure inherently discloses elements used in embodiments incorporating technology available at the time of this disclosure.

Hard disk drives (or HDDs) typically comprise a spindle motor for rotating one or more disks. The spindle motor can be operated in a variety of modes, including, but not limited to, mechanical windowless mode, electrical single edge/phase mode, electrical multi-phase mode. To maintain speed regulation of the spindle motor, spindle interrupts are utilized to update the spindle digital to analog converter (DAC). This helps compensate for errors (if any) in the spindle motor speed. In some cases, the spindle motor may be operated in one of the electrical modes (e.g., single edge/phase, multi edge/phase) for tasks that require high frequency input. For example, the spindle motor may be operated in an electrical mode while writing servo spiral tracks (or bootstrap spiral tracks). Additionally, the spindle motor may be operated in the mechanical window mode (or alternatively, mechanical windowless mode) for tasks that require low frequency input. In some cases, the mechanical mode (i.e., window or windowless) may be employed during normal operations of the disk drive. In some circumstances, the firmware (FW) or hardware (HW) of the disk drive may switch the mode of operation of the spindle motor, for instance, from the electrical single edge mode to the mechanical window mode. Interrupt Service Routine (or ISR) may include the process of updating the spindle DAC using spindle interrupts. Ideally, the spindle ISR should happen at the same or substantially the same location (e.g., BEMF cross #0, magnetic pole-pair #0) when the spindle motor switches from one mode to another. Currently used techniques for maintaining consistent motor location for spindle interrupts when the spindle changes mode are lacking in several regards. Broadly, aspects of the present disclosure are directed to techniques for helping maintain consistent motor location for spindle interrupts when the spindle motor changes modes, as described in further detail below.

Figure 3:
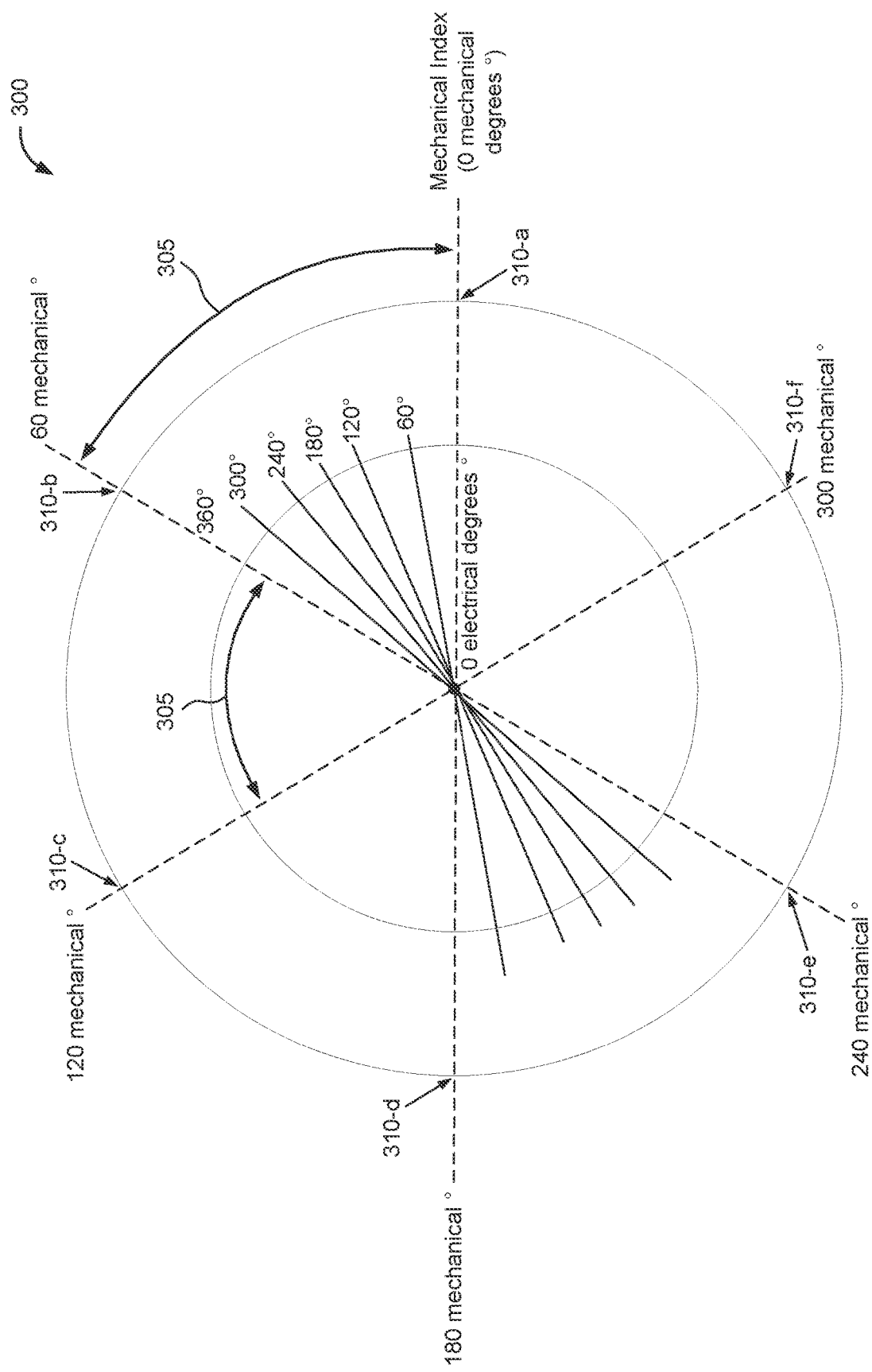
FIG. 3 illustrates a schematic view of a spindle motor having a plurality of electrical poles or pairs and three-phase back electromotive force (BEMF) crosses, according to various aspects of the disclosure.

FIG. 3 illustrates an example of a spindle motor 300 comprising a plurality of electrical poles/pairs 310 arranged around the circumference of the spindle motor. In this example, there are six pole-pairs 310 (e.g., pole-pair 310-a, pole-pair 310-b, pole-pair 310-c, pole-pair 310-d, pole-pair 310-e, and pole-pair 310-f). Further, pole-pair 310-a (also referred to as pole-pair #0) is aligned with the mechanical index at 0 mechanical degrees. Additionally, the pole-pairs 310 are positioned at 60-degree intervals. For instance, pole-pair 310-b (or pole-pair #1) is positioned at 60 mechanical degrees, pole pair 310-c (or pole-pair #2) is positioned at 120 mechanical degrees, and so on. FIG. 3 also depicts a plurality of wedges 305, where each wedge spans between adjacent magnetic pole-pairs. In this example, each wedge 305 spans 60 degrees corresponds to 1 electrical revolution. Additionally, there are 6 electrical revolutions for each mechanical revolution. In some cases, each wedge 305 corresponding to 1 electrical revolution is further subdivided (e.g., by 60 electrical degree intervals).

In one non-limiting example, the mechanical index (0 mechanical degrees or BEMF cross #0) may be selected as the location where the spindle interrupts or ISR should occur after switching from a first mode (e.g., mechanical window mode) to a second mode (e.g., electrical single edge mode). In such cases, the mechanical index may be referred to as the reference point for spindle interrupts. In some circumstances, however, in the prior art, the spindle ISR may occur out of sync (i.e., at a different location) after the spindle switches mode. As an example, the spindle ISR may occur at a different pole pair (e.g., pole-pair 310-c, pole-pair 310-d), or between two pole-pairs (e.g., at 300 electrical degrees between pole-pair 310-a and 310-b). Aspects of the present disclosure are directed to mitigating this issue in the prior art where a consistent spindle motor location is not maintained for spindle interrupts when the mode of operation of the spindle motor is changed.

Figure 1:
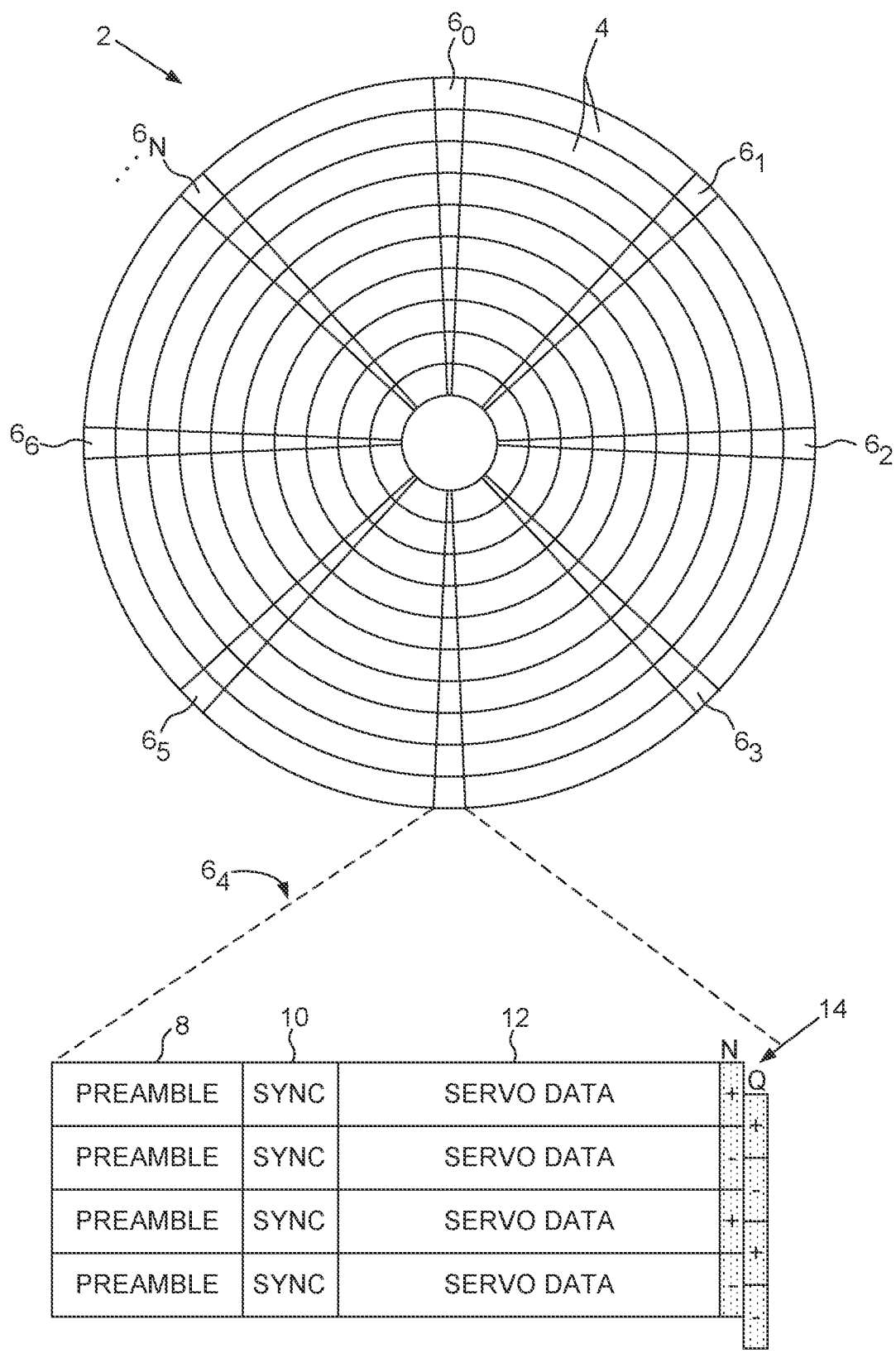
FIG. 1 shows a disk format as comprising a number of radially-spaced, concentric servo tracks defined by servo wedges recorded around the circumference of each servo track, according to various aspects of the present disclosure.
Figure 2C:
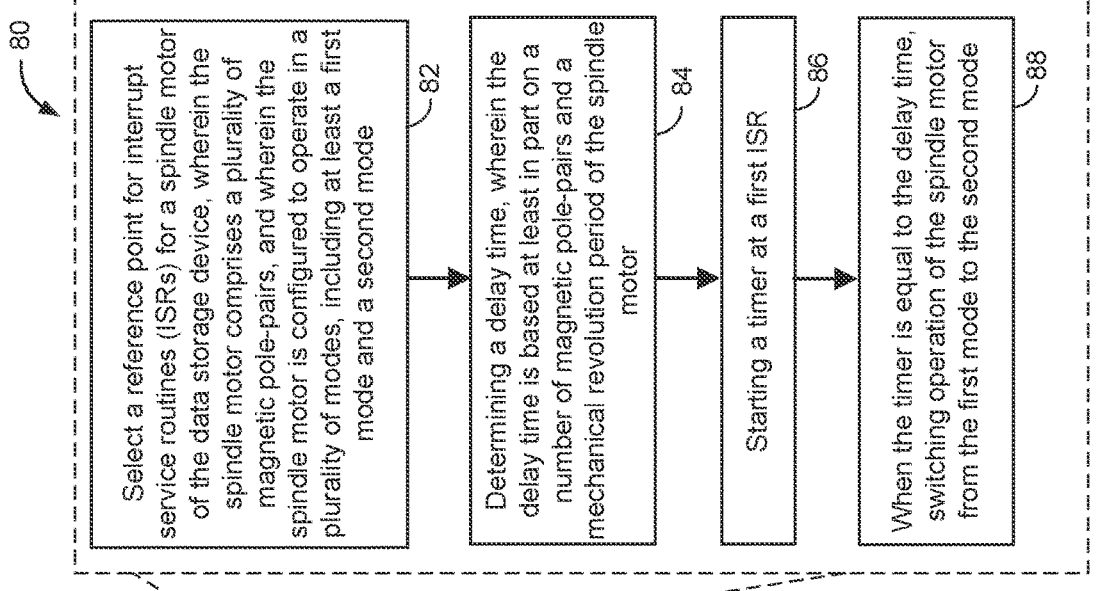
FIG. 2C illustrates a method that a data storage device may perform, execute, and implement, according to various aspects of the present disclosure.

In some cases, aspects of the present disclosure may be implemented using firmware (FW), hardware (HW), or a combination thereof. In some cases, the FW may utilize a delay timer, where the delay timer specifies the time (e.g., maybe defined as a ratio or fraction of the mechanical period, such as $5/6^{th}$ of the mechanical period) at which the PLSI device should switch the mode of the spindle motor, further described below in relation to FIGS. 4-15. Additionally, or alternatively, the FW and/or HW may be used to one or more of: (1) determine the number of BEMF crosses for each electrical revolution (e.g., 1 BEMF cross for each electrical revolution, 6 BEMF crosses for each electrical revolution, to name two non-limiting examples), (2) determine the frequency at which spindle interrupts are being produced for the current mode (e.g., 1 interrupt for every 6th BEMF cross) vs the new mode (e.g., 1 interrupt for every BEMF cross), and instruct the PLSI to switch to the new mode when a pre-defined number of BEMF crosses (e.g., 5 BEMF crosses) have been counted since the most recent ISR, further described below in relation to FIGS. 4-15. As used herein, the terms "BEMF cross", "BEMF detection window", and "BEMF window" may be used interchangeably throughout the disclosure, and may be used to refer to specific instances where the control circuitry 22 (or alternatively, the PLSI circuit) extracts BEMF information Turning now to FIGS. 2A and 2B, which illustrate conceptual block diagrams of a top view and a side view of a data storage device in the form of a disk drive 15, in accordance with aspects of the present disclosure. Disk drive 15 comprises control circuitry 22, an actuator assembly 19, and a plurality of hard disks 16A, 16B, 16C, 16D ("hard disks 16," "disks 16"). FIG. 2C depicts a flowchart for an example method 80 that control circuitry 22 of disk drive 15 may perform or execute in controlling the operations of disk drive 15, including the operations of heads 18 (e.g., heads 18A-18H) disposed on actuator assembly 19, in accordance with aspects of the present disclosure, as further described below. Actuator assembly 19 thus comprises heads 18 and is configured to position the one or more heads 18 over disk surfaces 17 of the one or more disks 16. Heads 18 may each comprise write and read elements, configured for writing and reading control features and data to and from a corresponding disk surface 17 of hard disks 16.

Figure 2A:
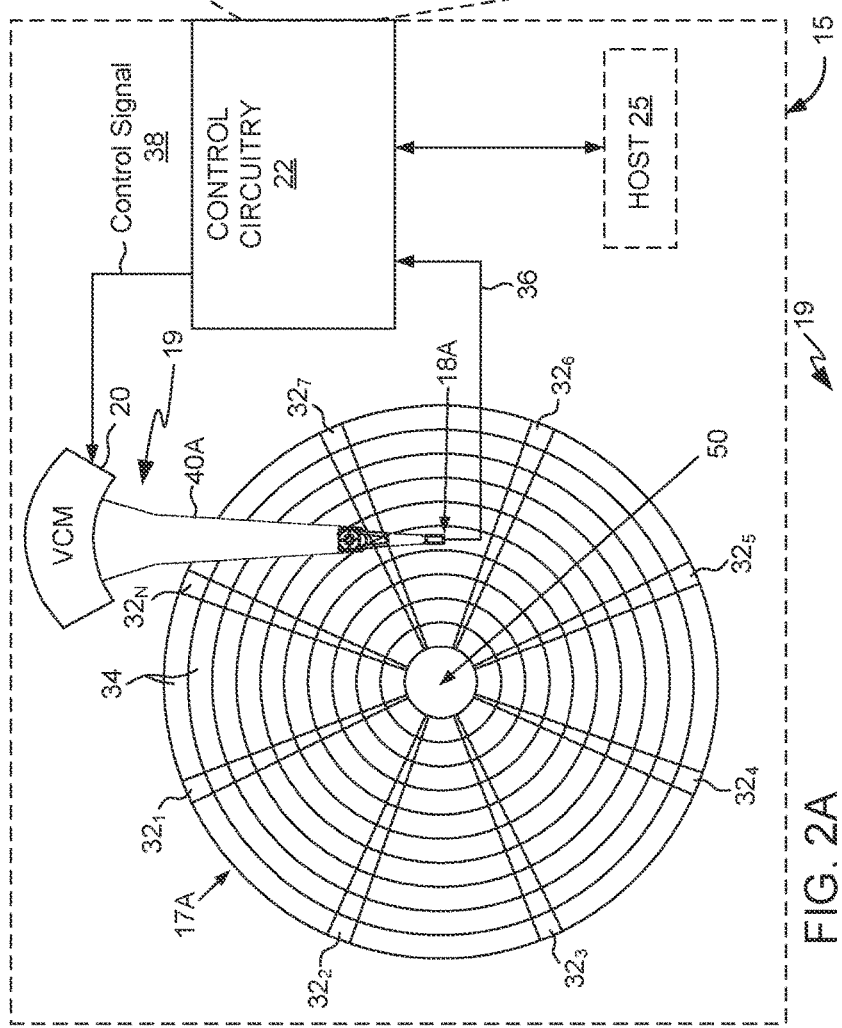
FIGS. 2A and 2B illustrate conceptual block diagrams of a top view and a side view of a data storage device in the form of a disk drive, according to various aspects of the present disclosure.
Figure 2B:
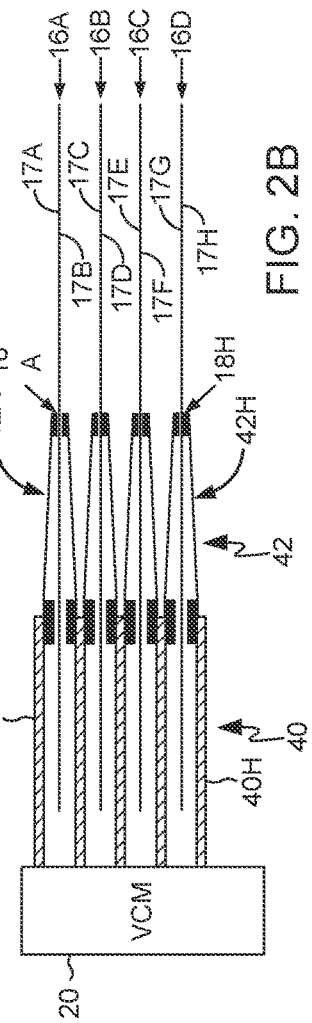

Actuator assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a head 18 at a distal end thereof (e.g., example head 18A comprised in topmost actuator arm 40A, in the view of FIGS. 2A and 2B). Each of actuator arms 40 is configured to suspend one of heads 18 in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Various examples may include any of a wide variety of other numbers of hard disks and disk surfaces, other numbers of actuator arm assemblies and primary actuators besides the one actuator assembly 19 and the one primary actuator 20 in the example of FIGS. 2A and 2B, and other numbers of fine actuators on each actuator arm, for example.

FIG. 2A also depicts servo sectors 32 (e.g., servo sectors 321 through 32N) written onto disk surfaces 17. In some cases, when manufacturing a disk drive, servo sectors 32 may be written to disk surfaces 17 to define a plurality of evenly-spaced, concentric tracks 34. As an example, each servo sector 32 may include a phase lock loop (PLL) field, a servo sync mark (SSM) field, a track identification (TKID) field, a sector ID, and a group of servo bursts (e.g., an alternating pattern of magnetic transitions) that the servo system of the disk drive samples to align the moveable transducer head (e.g., disk head 18) with and relative to, a particular track 34. Each circumferential track 34 includes a plurality of embedded servo sectors 32 utilized in seeking and track following. The plurality of servo sectors 32 are spaced sequentially around the circumference of a circumferential track 34 and extend radially outward from the inner diameter (ID) of disk surface 17. These embedded servo sectors 32 contain servo information utilized in seeking and track following and are interspersed between data regions on disk surfaces 17. Data is conventionally written in the data regions in a plurality of discrete data sectors. Each data region is typically preceded by a servo sector 32. Host 25 may be a computing device such as a desktop computer, a laptop, a server, a mobile computing device (e.g., smartphone, tablet, Netbook, to name a few non-limiting examples), or any other applicable computing device. Alternatively, host 25 may be a test computer that performs calibration and testing functions as part of the disk drive manufacturing processing.

In some examples, the control circuitry 22 is configured to control the actuation of the primary actuator (i.e., VCM), as well as the spindle motor. Further, the VCM is configured to actuate the head 18 over the disk surfaces 17. As shown in FIG. 2C, at operation 82, the control circuitry 22 is configured to select a reference point for spindle motor interrupt service routines (ISRs), also referred to as spindle interrupts. The spindle motor 50 (shown in FIG. 2A) may comprise a plurality of magnetic pole-pairs and may be configured to operate in a plurality of modes, including at least a first mode and a second mode. At operation 84, the control circuitry 22 is configured to determine a delay time, where the delay time is based at least in part on one or more of a number of magnetic pole-pairs and a mechanical revolution period of the spindle motor. At operation 86, the control circuitry 22 is configured to start a timer at a first ISR. Additionally, at operation 88, the control circuitry 22 is configured to switch operation of the spindle motor from the first mode to the second mode when the timer is equal to the delay time.

In the embodiment of FIG. 2A, the control circuitry 22 may also process a read signal 36 emanating from the head 18A to demodulate servo data written on the disk (e.g., servo sectors 32) to generate a position error signal (PES) representing an error between the actual position of the head and a target position relative to a target track. The control circuitry 22 may process the PES using a suitable servo control system to generate the control signal 38 (e.g., a VCM control signal) applied to the VCM 20 which rotates an actuator arm 40 about a pivot in order to actuate the head 18 radially over the disk surface 17 in a direction that reduces the PES. In one embodiment, the disk drive may also comprise a suitable microactuator, such as a suitable piezoelectric (PZT) element for actuating the head 18 relative to a suspension, or for actuating a suspension relative to the actuator arm 40. In some other cases, the control signal 38 may be a spindle motor control signal applied to the spindle motor 50, where the control signal 38 may be used to control the speed of the spindle motor based on the extracted BEMF information.

In one embodiment, the servo data (e.g., servo sectors 32) read from the disk surface 17, i.e., in order to servo the head over the disk during access operations, may be self-written to the disk using the control circuitry 22 internal to the disk drive. In some examples, a plurality of spiral servo tracks are first written to the disk surface 17, and then servo sectors 32 are written to the disk while servoing on the spiral servo tracks.

In some cases, the spindle motor assembly 50 comprises a spindle motor, a spindle motor driver, a spindle motor controller. Alternatively, the spindle motor assembly 50 may be controlled using the control circuitry 22, in which case there is no spindle motor controller (or the spindle motor controller is optional). The spindle motor comprises windings and a rotatable rotor, and the spindle motor driver is connected to the windings. The spindle motor driver is used to apply a voltage across the windings, which causes the rotor to rotate. In some cases, this rotation induces a BEMF voltage across the windings.

Figure 4:
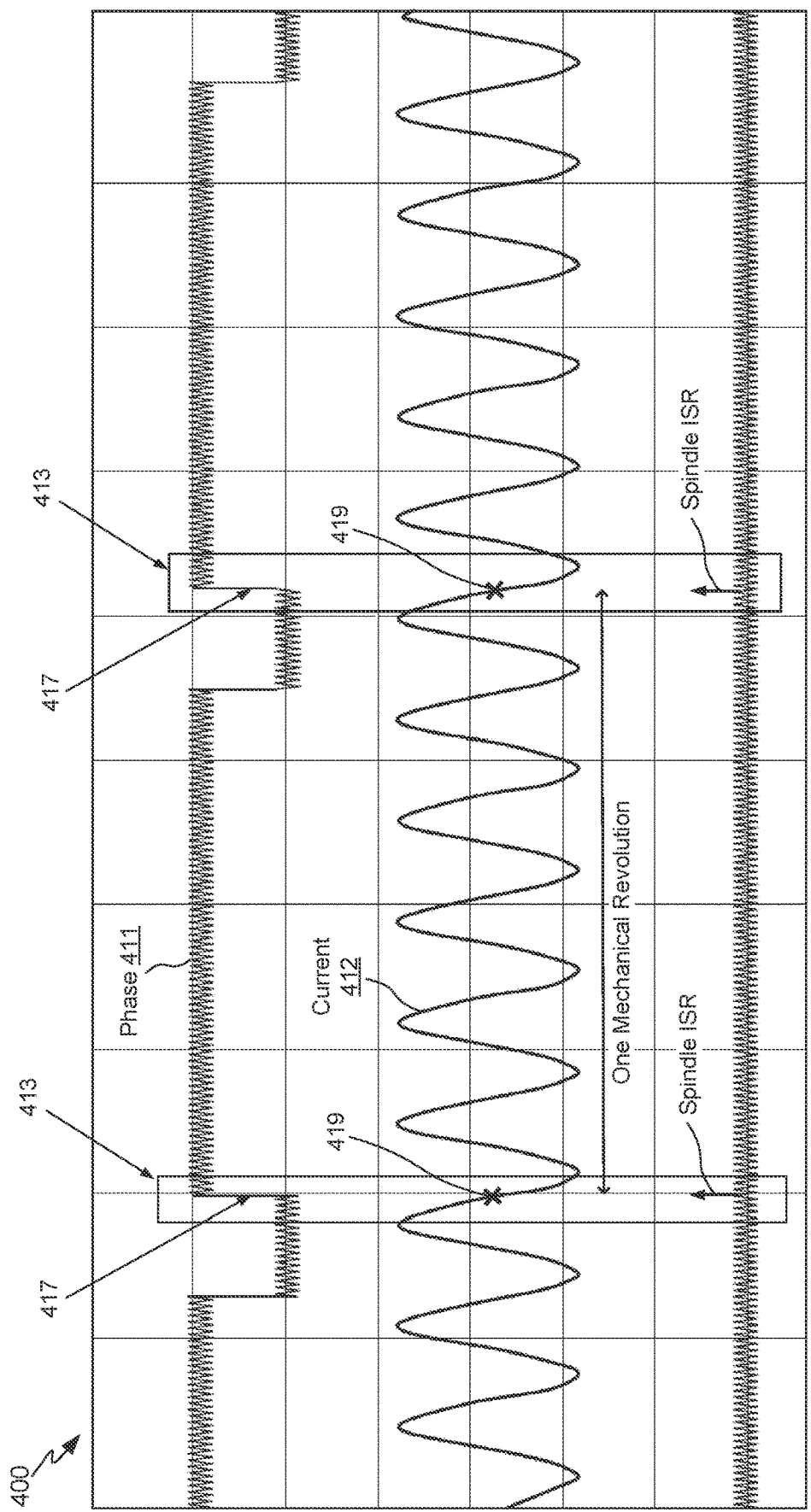
FIG. 4 illustrates a scope plot for a spindle motor operating in a mechanical mode, according to various aspects of the disclosure.

Turning now to FIG. 4, which illustrates an example of a scope plot 400 for a spindle motor (e.g., spindle motor of spindle motor assembly 50) operating in a mechanical mode, according to various aspects of the disclosure. The scope plot 400 shows a plurality of traces, where the trace shown on the top corresponds to a spindle motor phase 411 and the middle trace corresponds to a spindle motor current 412. Scope plot 400 also shows a third (bottom) trace corresponding to the current from the power supply. Further, scope plot 400 depicts a plurality of BEMF windows 413, which are used by the PLSI to extract BEMF information and determine the speed of the spindle motor 50. As noted above, the mechanical mode may be utilized for low frequency tasks performed by the HDD, such as, but not limited to, normal read-write operations of user data. In this example, there is a single BEMF window 413 for each mechanical revolution. Additionally, each BEMF window includes a BEMF cross 419, where each BEMF cross 419 aligns with a rising edge 417 of the spindle motor phase 411. As seen, the distance between adjacent BEMF windows or crosses is 1 mechanical revolution.

Figure 5:
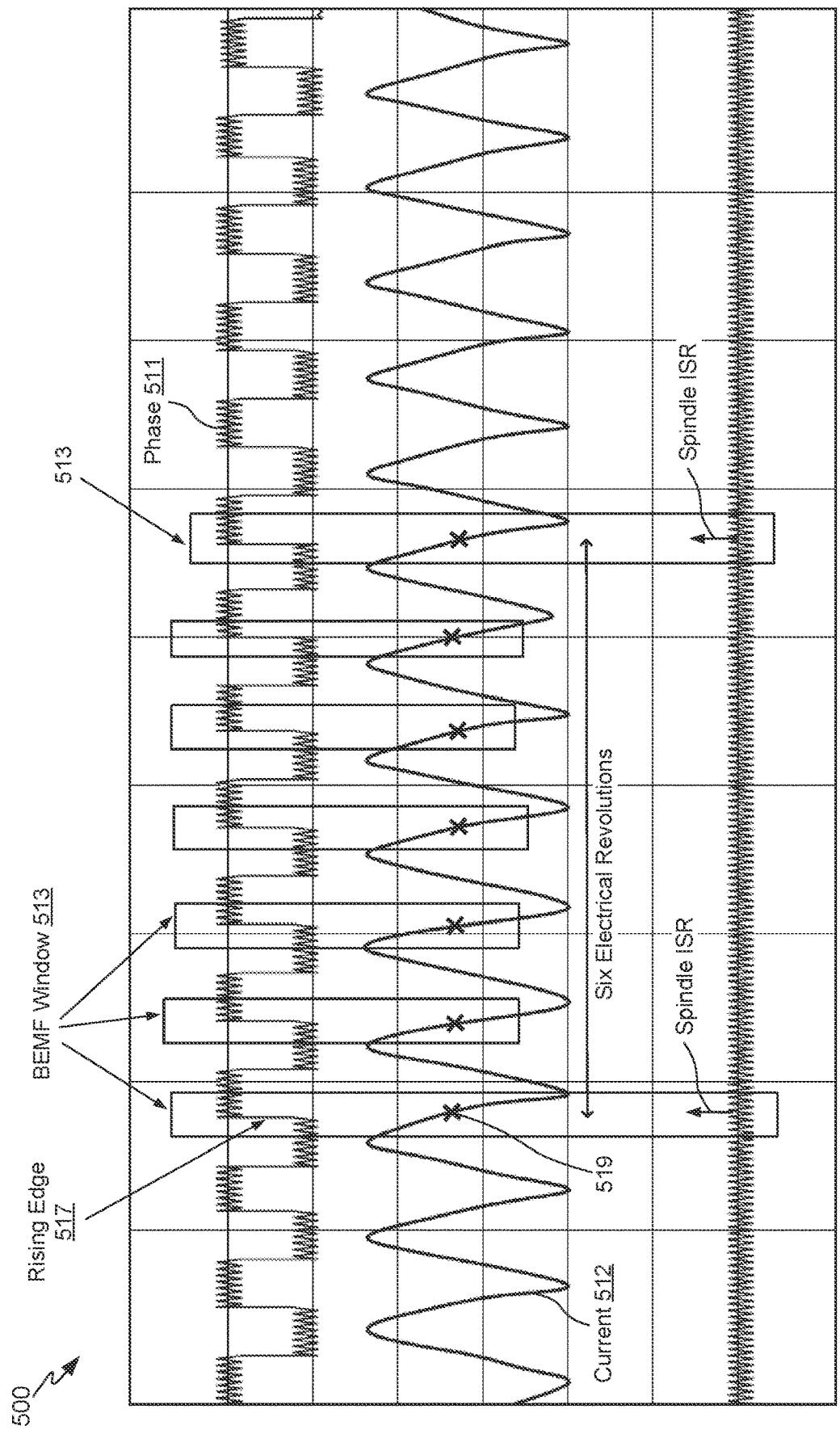
FIG. 5 illustrates a scope plot for a spindle motor operating in an electrical single-phase mode, according to various aspects of the disclosure.

FIG. 5 illustrates a scope plot 500 for a spindle motor operating in an electrical single-phase mode, according to various aspects of the disclosure. The scope plot 500 shows a plurality of traces, where the topmost trace corresponds to a spindle motor phase 511 and the middle trace corresponds to a spindle motor current 512. Similar to scope plot 400, the trace on the bottom corresponds to the current from the power supply. As seen, scope plot 500 comprises a plurality of BEMF windows 513, each comprising a BEMF cross 519 that is aligned with a rising edge 517 of the spindle motor phase 511 trace. In this example, there is one BEMF window (or BEMF cross 519) for each electrical revolution and the spindle motor comprises six pole-pairs of magnets. Additionally, the spindle ISR (shown by way of the vertical arrows on the bottom trace) is performed once for every six electrical revolutions.

Figure 6A:
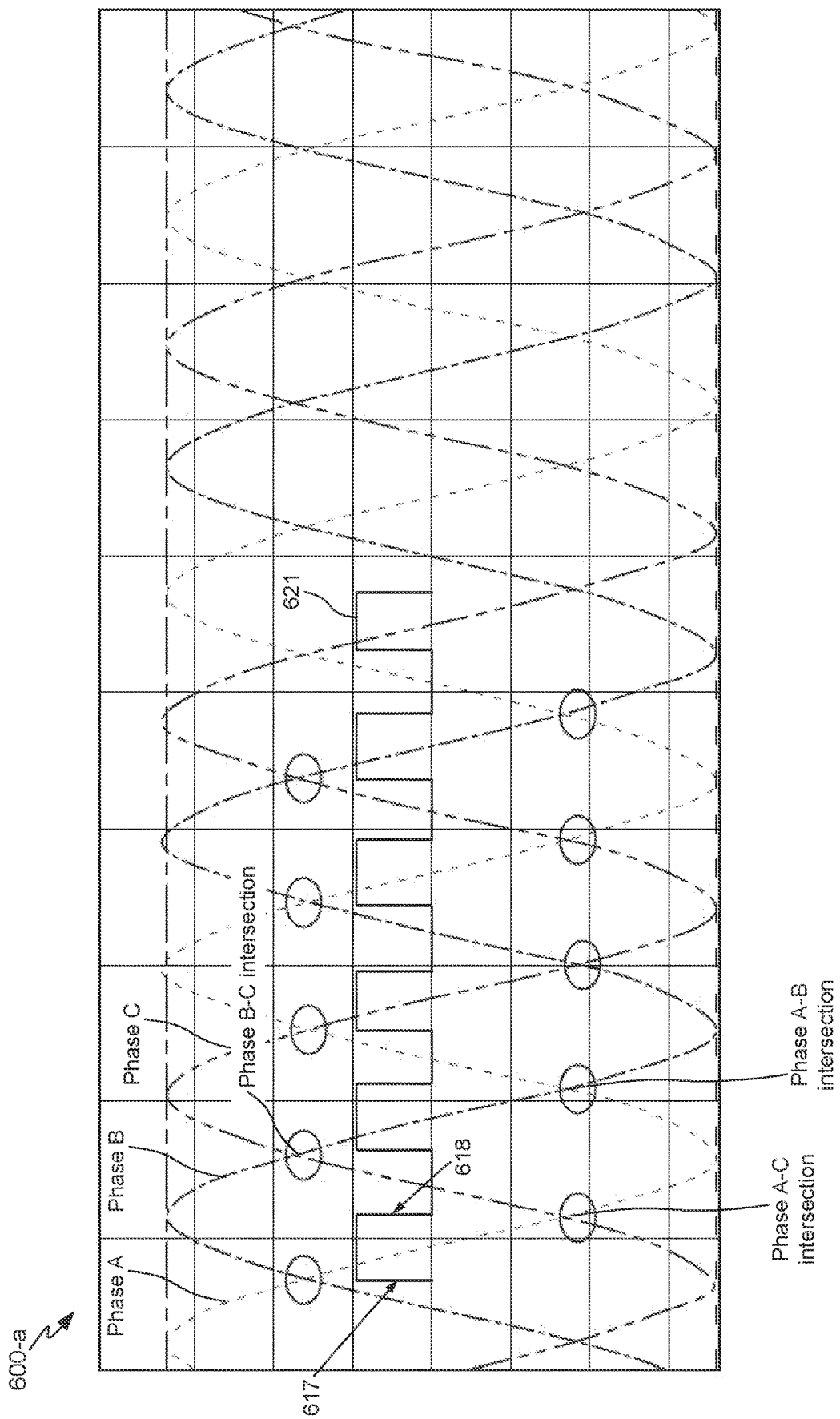
FIG. 6A illustrates a scope plot showing the three phases of a spindle motor, including their intercepts, with respect to the rising and falling edges of the power large scale integrated (PLSI) circuit phase, according to various aspects of the disclosure.

FIG. 6A illustrates a scope plot showing the three phases (e.g., phase A, B, C) of a spindle motor, including their intersections, with respect to the rising and falling edges 617 and 618, respectively, of the power large scale integrated (PLSI) phase 621. In this example, the spindle motor comprises six pole-pairs of magnets. Further, the crossing of the signals for the various phases (e.g., phase A-C intersection, phase A-B intersection, phase B-C intersection) allows the rising/falling edges 617 and 618 of the PLSI phase 621 to be determined.

Figure 6B:
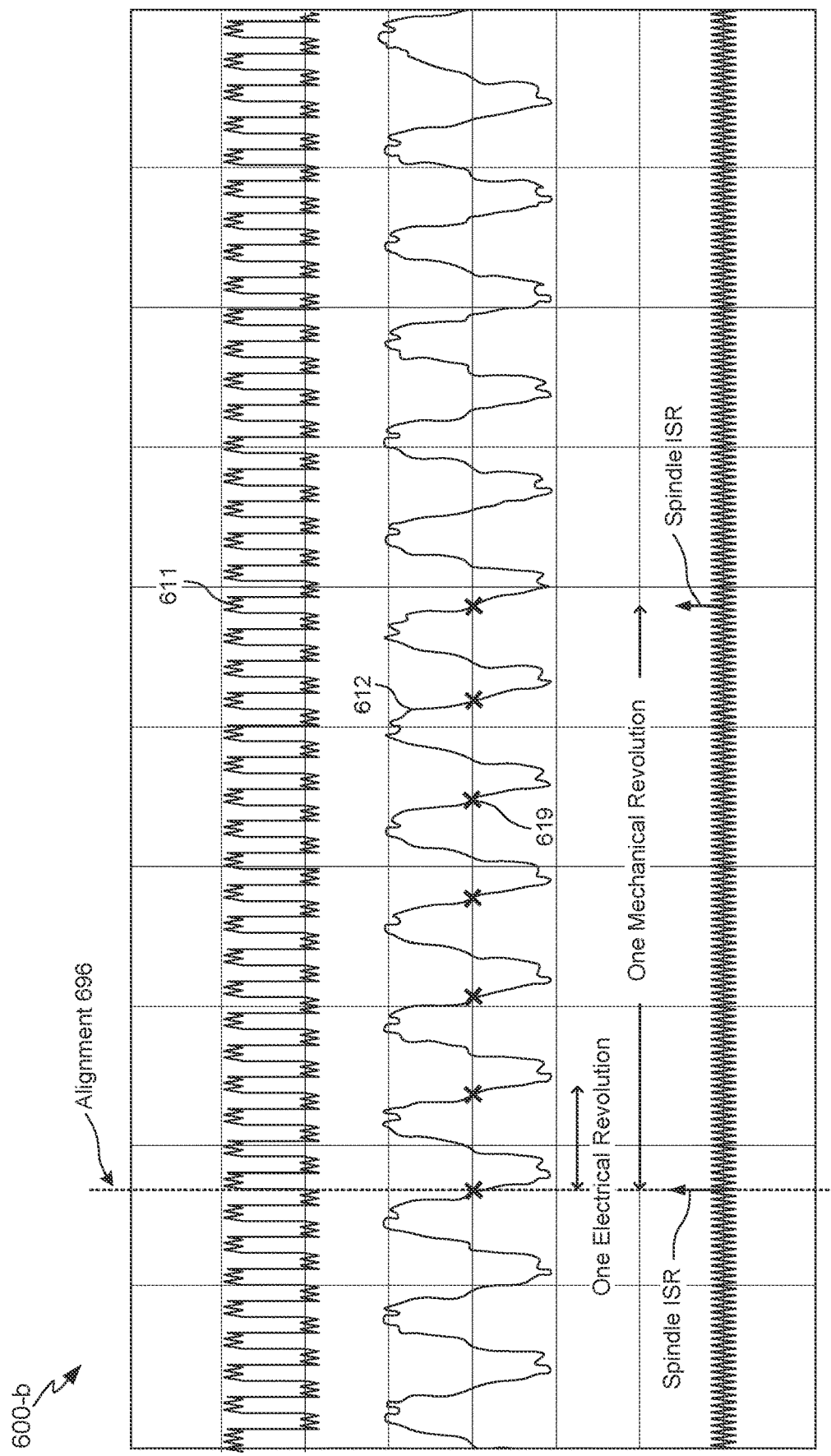
FIG. 6B illustrates a scope plot for a spindle motor operating in an electrical multi-phase mode, according to various aspects of the disclosure.

FIG. 6B illustrates a scope plot 600-b for a spindle motor operating in an electrical multi-phase mode, according to various aspects of the disclosure. The scope plot 600-b shows a plurality of traces, where the topmost trace corresponds to a spindle motor phase 611 and the middle trace corresponds to a spindle motor current 612. In this example, there are six BEMF windows or crosses 619 for each electrical revolution and six electrical revolutions for each mechanical revolution. Accordingly, there are thirty-six BEMF windows for every mechanical revolution. The scope plot 600-b in FIG. 6B is largely similar to the scope plot 500 described above in relation to FIG. 5, but with a higher frequency. Here, there is more signal distortion due to the higher rate (e.g., 36 BEMF windows per mechanical revolution vs 6 BEMF windows per mechanical revolution) at which the BEMF windows are opened. As seen, each BEMF window/cross 619 is aligned 696 with a rising edge of the spindle motor phase 611.

Figure 7:
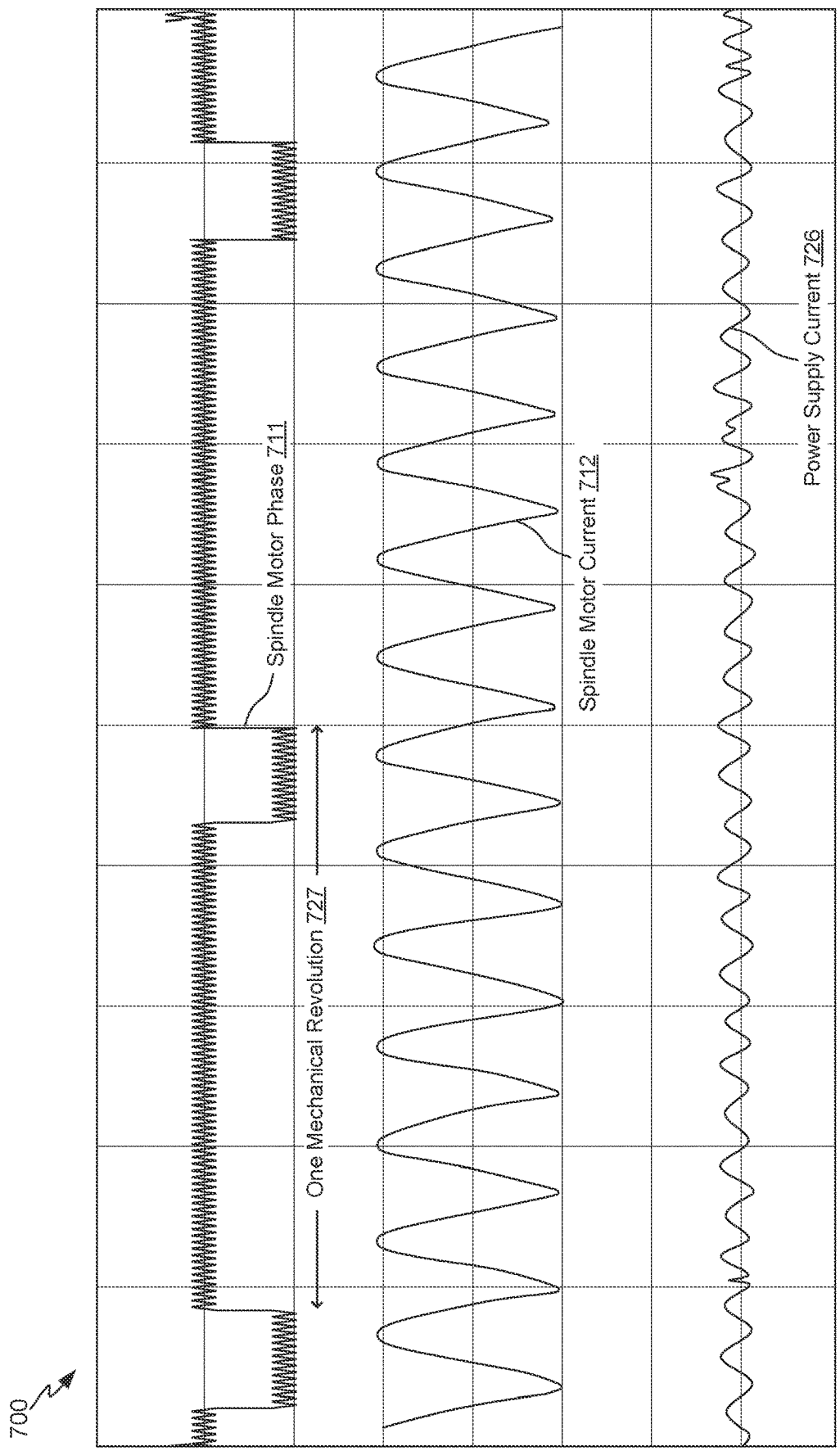
FIG. 7 illustrates a scope plot for a spindle motor operating in a mechanical windowless mode, according to various aspects of the disclosure.

FIG. 7 illustrates a scope plot 700 for a spindle motor operating in a mechanical windowless mode, according to various aspects of the disclosure. The scope plot 700 shows a plurality of traces, where the topmost trace corresponds to a spindle motor phase 711, the middle trace corresponds to a spindle motor current 712, and the bottom trace corresponds to a power supply current 726. FIG. 7 also depicts one or more mechanical revolution periods 727. As seen, there are no BEMF windows (or BEMF crosses) when the spindle motor is operating in the mechanical windowless mode. In such cases, the spindle motor phase is referenced to zero current (e.g., zero cross of spindle motor current is determined).

Figure 8A:
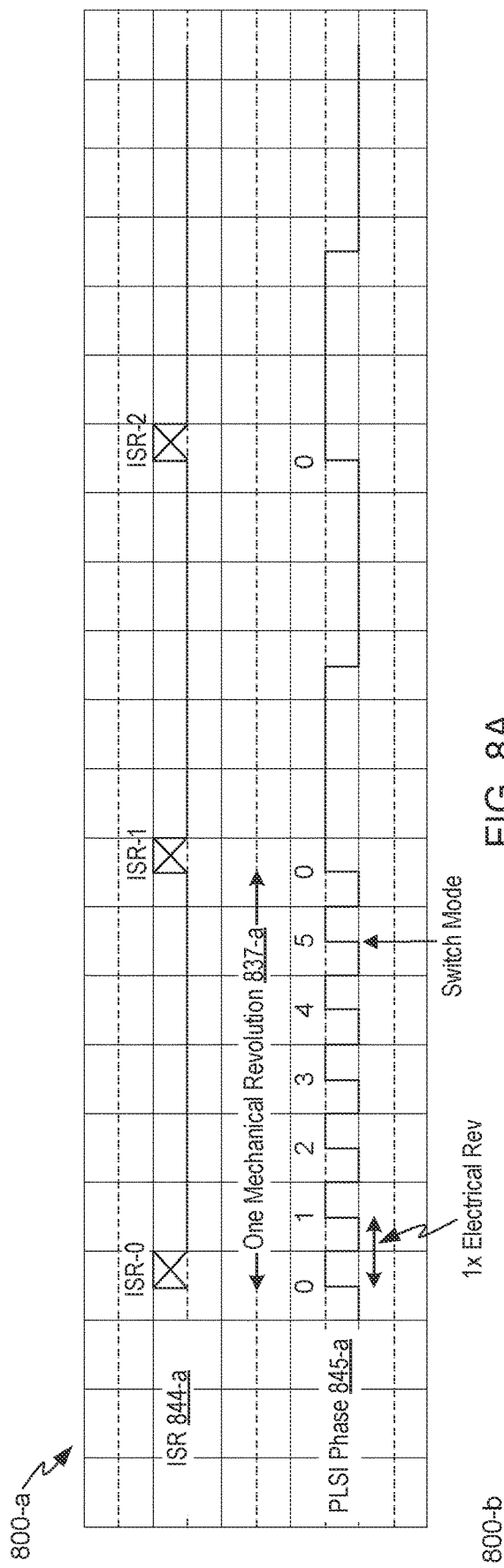
FIG. 8A illustrates a conceptual graph depicting a spindle motor switching synchronously from an electrical single-phase mode to a mechanical mode, according to various aspects of the disclosure.

FIG. 8A illustrates a conceptual graph 800-a depicting a spindle motor switching synchronously from an electrical single-phase mode to a mechanical mode, according to various aspects of the disclosure. Conceptual graph 800-a depicts an interrupt service routine (ISR) 844-a, where ISR 844-a includes a plurality of ISRs (e.g., ISR 0, ISR 1, ISR 2, etc.). In this example, the time span between adjacent ISRs corresponds to one mechanical revolution 837-a. Graph 800-a also depicts a PLSI phase 845-a. Initially, the spindle motor operates in an electrical single-phase mode. For instance, the spindle motor is operating in an electrical mode between ISR-0 and ISR-1. In some cases, the mode of operation of the spindle motor can be switched, for instance, from the electrical single-phase mode to the mechanical mode. As seen, from ISR-1 onwards, the spindle motor switches to the mechanical mode. In some embodiments, the mode of operation of the spindle motor can be switched in the time span between two adjacent ISRs. For instance, the mode of operation can be switched a pre-defined duration (or delay) after the start of ISR-0, where the pre-defined duration or delay is based at least in part on the number of electrical revolutions (e.g., 6) for each mechanical revolution, the duration of a mechanical revolution, the duration of an electrical revolution, the number of magnetic pole-pairs (e.g., 6), or a combination thereof. As an example, the mode of operation can be switched when a delay timer equals $5/6^{th}$ of a mechanical revolution, or 5× an electrical revolution, which helps ensure that the spindle motor is operating in the new mode (e.g., mechanical mode) at the start of the next ISR (ISR-1). Alternatively, the mode of operation can be switched when a pre-defined number of BEMF crosses/windows are detected. For example, the mode of operation can be switched when 5 BEMF crosses/windows are detected, which ensures that the spindle motor operates in the new mode (e.g., mechanical mode) at the start of the next ISR (ISR-1).

Figure 8B:
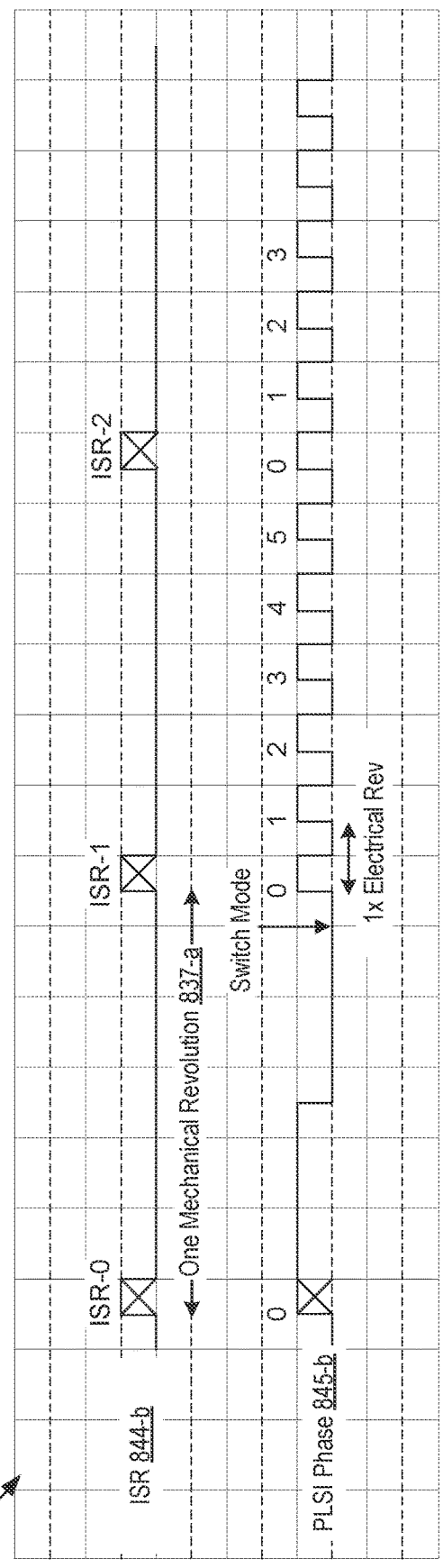
FIG. 8B illustrates a conceptual graph depicting a spindle motor switching synchronously from a mechanical mode to an electrical single-phase mode, according to various aspects of the disclosure.

FIG. 8B illustrates a conceptual graph 800-b depicting a spindle motor switching synchronously from a mechanical mode to an electrical single-phase mode, according to various aspects of the disclosure. Conceptual graph 800-b depicts an interrupt service routine (ISR) 844-b, where ISR 844-b includes a plurality of ISRs (e.g., ISR 0, ISR 1, ISR 2, etc.). In this example, the time span between adjacent ISRs corresponds to one mechanical revolution 837-a. Graph 800-b also depicts a PLSI phase 845-b. Initially, the spindle motor operates in the mechanical mode. For instance, the spindle motor is operating in the mechanical mode between ISR-0 and ISR-1. In some cases, the mode of operation of the spindle motor can be switched, for instance, from the mechanical mode to the electrical single-phase mode. As seen, from ISR-1 onwards, the spindle motor switches to the electrical single-phase mode. In some embodiments, the mode of operation of the spindle motor can be switched in the time span between two adjacent ISRs. For instance, the mode of operation can be switched a pre-defined duration (or delay) after the start of ISR-0, where the pre-defined duration or delay is based at least in part on the number of electrical revolutions (e.g., 6) for each mechanical revolution, the duration of a mechanical revolution, the duration of an electrical revolution, the number of magnetic pole-pairs of the spindle motor, or a combination thereof. As an example, the mode of operation can be switched when a delay timer equals $5/6^{th}$ of a mechanical revolution, or 5× an electrical revolution, which helps ensure that the spindle motor is operating in the new mode (e.g., electrical single-phase mode) at the start of the next ISR (ISR-1).

FIG. 9 illustrates an example of a method 900 for switching synchronously from an electrical mode (e.g., electrical single-phase, electrical multi-phase) to a mechanical mode based on calculating a delay time, according to various aspects of the disclosure. At step 902, the method 900 comprises starting a timer at a spindle motor ISR (e.g., ISR-0 in FIG. 8A, where ISR-0 occurs at time 0). At step 904, the method 900 comprises determining a delay time based at least in part on one or more of a number of spindle motor magnets (or pole-pairs), a number of electrical revolutions for each mechanical revolution, a number of BEMF crosses for each electrical revolution, and a period of a mechanical revolution. In some circumstances, the HDD or disk drive may not include magnetic sensors or switches (e.g., Hall-effect sensors) for measuring the speed of the spindle motor. Instead, the speed of the spindle motor may be calculated based on the BEMF generated by the spindle motor. In some cases, a spindle motor may include a plurality of magnets as part of the stator, where the number of magnets corresponds to the number of pole-pairs (i.e., because each magnet comprises a north-south pole pair). As noted above, each magnet (or pole-pair) corresponds to one period of electrical BEMF. When a motor completes one revolution, it is said to rotate or complete one mechanical revolution. Additionally, the number of electrical revolutions (e.g., 6) within one mechanical revolution is equal to the number of magnets (or pole-pairs). For example, a spindle motor having six magnets is said to have six pole-pairs. Prior to switching to the mechanical mode, the SoC may produce a spindle interrupt once for every 'n' rising/falling BEMF pulses, for example, once for every sixth rising/falling BEMF pulses.

At step 906, the FW may program the SoC to generate a spindle interrupt once for every rising edge of BEMF crosses. In some cases, the FW may program the PLSI device to switch to the mechanical mode (step 908). In some embodiments, the steps 906 and 908 may be performed concurrently, or alternatively, in the reverse order. Either way, the steps 906 and 908 may be performed when the timer is equal to (or substantially equal to) the delay time. In one non-limiting example, the delay time may be equal to ⅚th of the mechanical revolution period, although other delay times (e.g., ⅞th of a mechanical revolution period, 9/10th of a mechanical revolution period, etc.) are also contemplated in different embodiments, and the example ratios listed herein are not intended to be limiting. In this way, by programming the PLSI device to switch to the new mode (e.g., mechanical mode) a pre-defined duration of time prior to the next ISR may help ensure that the spindle motor ISR consistently remains at the same location (e.g., pole-pair #0 in FIG. 3) for every mechanical revolution. That is, the technique described above may help ensure consistent motor location (e.g., reference point, such as BEMF cross #0 or pole-pair #0) for spindle interrupts when the spindle motor changes modes.

Figure 10:
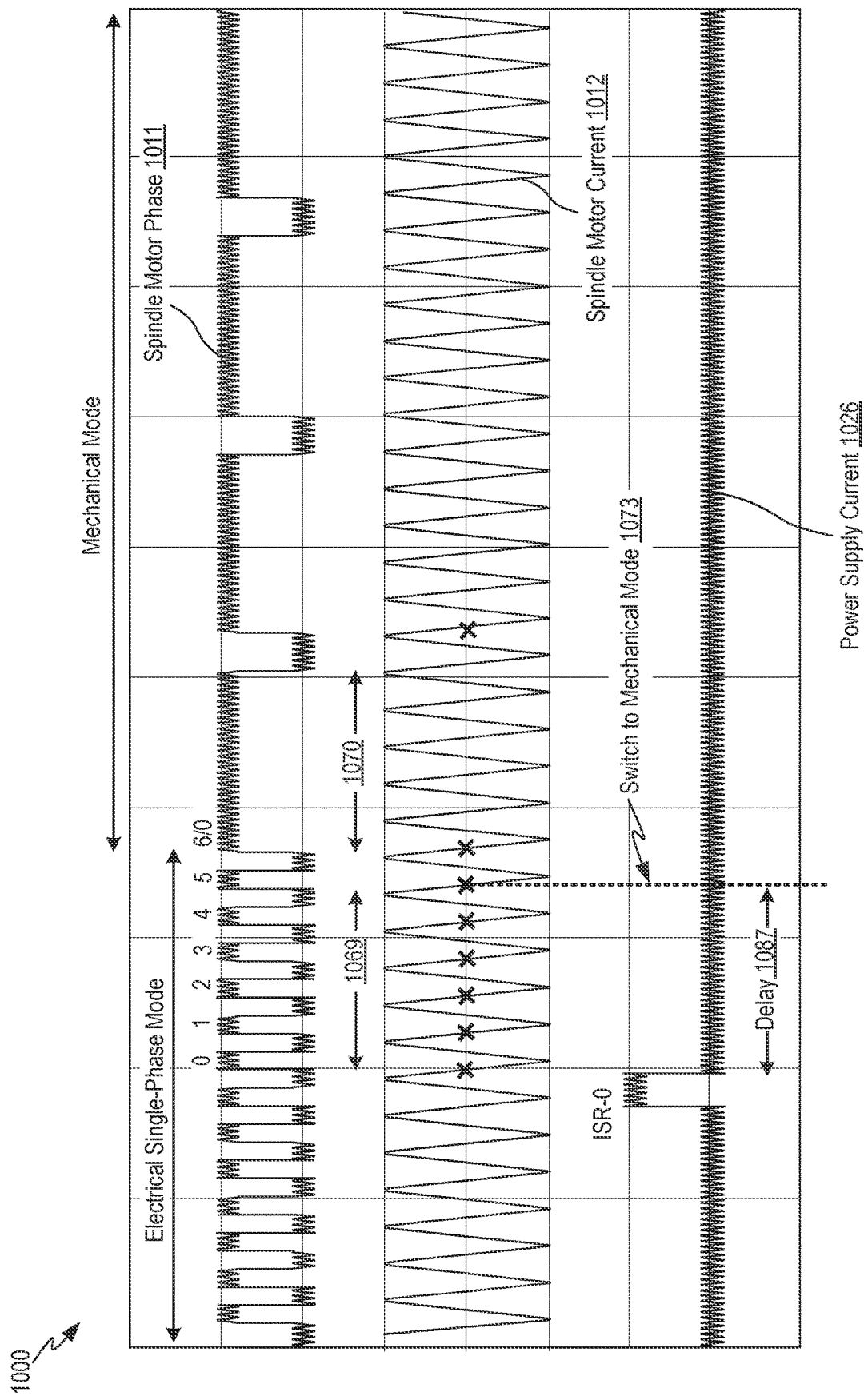
FIG. 10 illustrates a scope plot for a spindle motor switching synchronously from an electrical single-phase mode to a mechanical mode, according to various aspects of the disclosure.

FIG. 10 illustrates a scope plot 1000 for a spindle motor (e.g., spindle motor 50 in FIG. 2A, spindle motor 300 in FIG. 3) switching synchronously from an electrical single-phase mode to a mechanical mode, according to various aspects of the disclosure. As seen, the scope plot 1000 shows a plurality of waveform traces, including one corresponding to a spindle motor phase 1011, one corresponding to a spindle motor current 1012, and one corresponding to a power supply current 1026. Initially, the spindle motor operates in an electrical single-phase mode. Specifically, at the start of ISR-0, the spindle motor operates in the electrical single-phase mode. In some cases, the control circuitry 22 of the HDD is configured to start a delay timer at the spindle motor ISR (ISR-0). In this example, there are 6 electrical revolutions for each mechanical revolution, but other numbers of electrical revolutions per mechanical revolution are also contemplated in different embodiments. Additionally, each electrical revolution corresponds to 1 BEMF cross/window, where the BEMF crosses/windows are shown as the black 'X' marks on the spindle motor current 1012 trace. In some examples, the control circuitry 22 switches to the mechanical mode 1073 when the delay timer is equal to (or substantially equal to) a delay 1087. In some cases, the delay 1087 may be pre-determined and based on a mechanical revolution period and one or more of: the number of electrical revolutions for each mechanical revolution, and the number of spindle motor magnets or pole-pairs. In some examples, the delay time can be calculated as follows:

Delay Time=Mechanical Revolution Period*[(Number of Spin Pole Pairs−1)/(Number of Spin Pole Pairs)].

Using the equation above, in this example, the delay 1087 may be calculated to be ⅚th of the mechanical revolution period.

Since the spindle motor comprises 6 magnets (or 6 pole-pairs), the delay 1087 can be calculated to be a function (i.e., ⅚th) of the mechanical revolution period. In this example, the mechanical revolution period is shown as 1070, while ⅚th of the mechanical revolution period is shown as 1069. As an example, if the spindle motor is rotating at 7200 rpm, the mechanical period can be calculated to be 60/7200=0.0083 seconds=8.3 milliseconds. In this case, if the number of magnets (or pole-pairs) is 6, the delay time can be calculated as: (⅚)*8.3 milliseconds=6.9 milliseconds.

Figure 11:
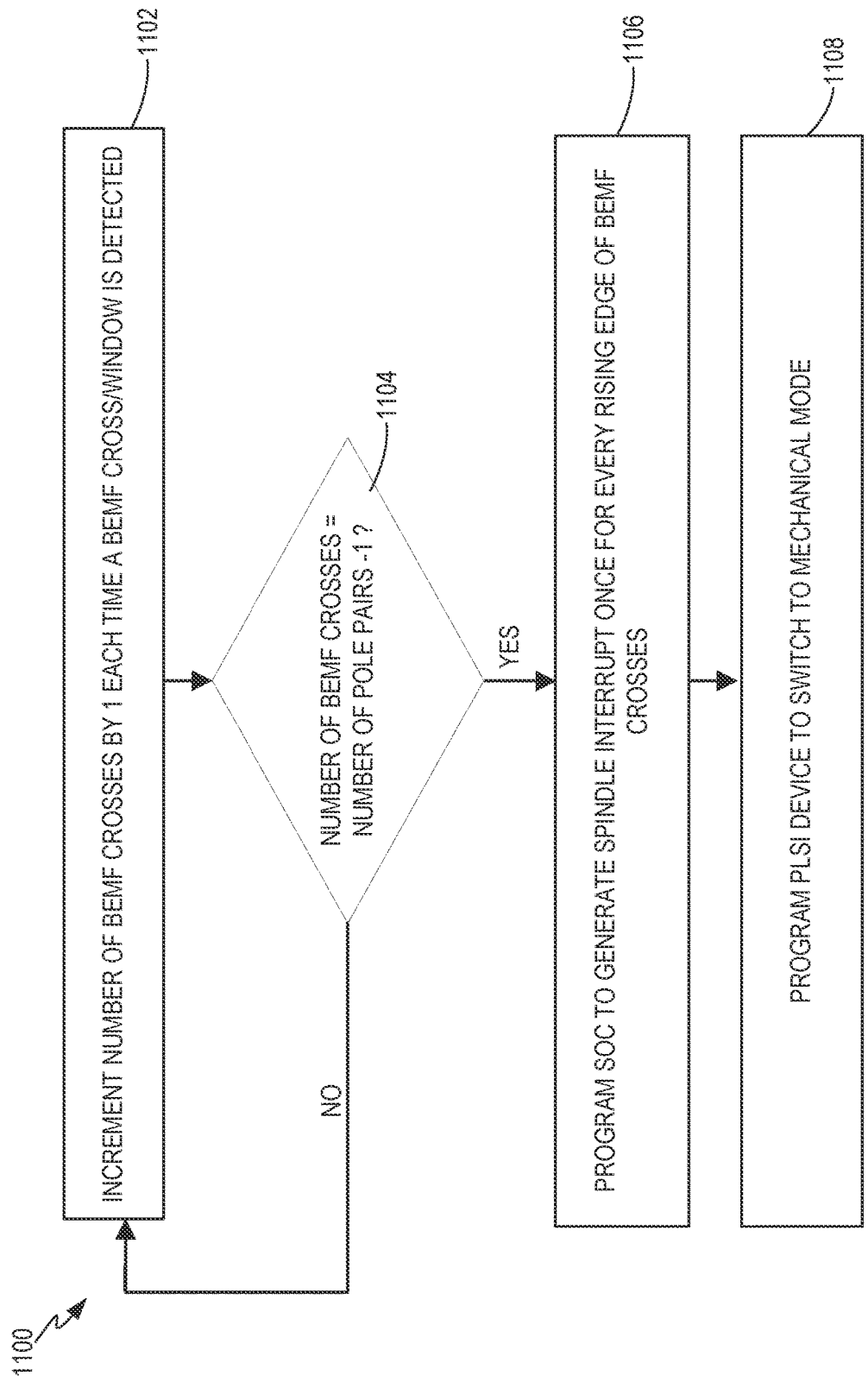
FIG. 11 illustrates another example of a method for switching synchronously from an electrical single-phase mode to a mechanical mode based on counting a number of BEMF crosses, according to various aspects of the disclosure.

FIG. 11 illustrates an example of a method 1100 for switching synchronously from an electrical mode (e.g., electrical single-phase, electrical multi-phase) to a mechanical mode based on counting a number of BEMF crosses, according to various aspects of the disclosure.

At step 1102, the method comprises incrementing a counter corresponding to a number of BEMF crosses by one each time a BEMF cross/window is detected in the electrical mode. In some cases, a BEMF cross or window is detected for each electrical revolution, herein referred to as the electrical single-phase mode. Alternatively, a plurality of BEMF crosses or windows (e.g., 6 BEMF crosses/windows) are detected for every electrical revolution, as described above in relation to FIG. 6B. In some cases, the counter may be initiated at the start of a spindle motor ISR (e.g., ISR-0, where ISR-0 occurs at time 0), at a reference point, or a combination thereof. In some cases, the PLSI starts counting the number of BEMF crosses at step 1102. Furthermore, at decision block 1104, the PLSI evaluates whether the number of BEMF crosses=number of pole pairs−1. If yes, at step 1106, the method 1100 comprises programming the SoC to generate a spindle interrupt once for every rising edge of BEMF crosses. Additionally, at step 1108, the method comprises programming or instructing the PLSI device to switch to the mechanical mode. In some cases, steps 1106 and 1108 may be performed concurrently, or alternatively, in the reverse order.

In some cases, the counter may be implemented using a flip-flop (or latch) circuit, a register in the PLSI logic circuit, or through any other applicable means known or contemplated in the art.

Figure 12:
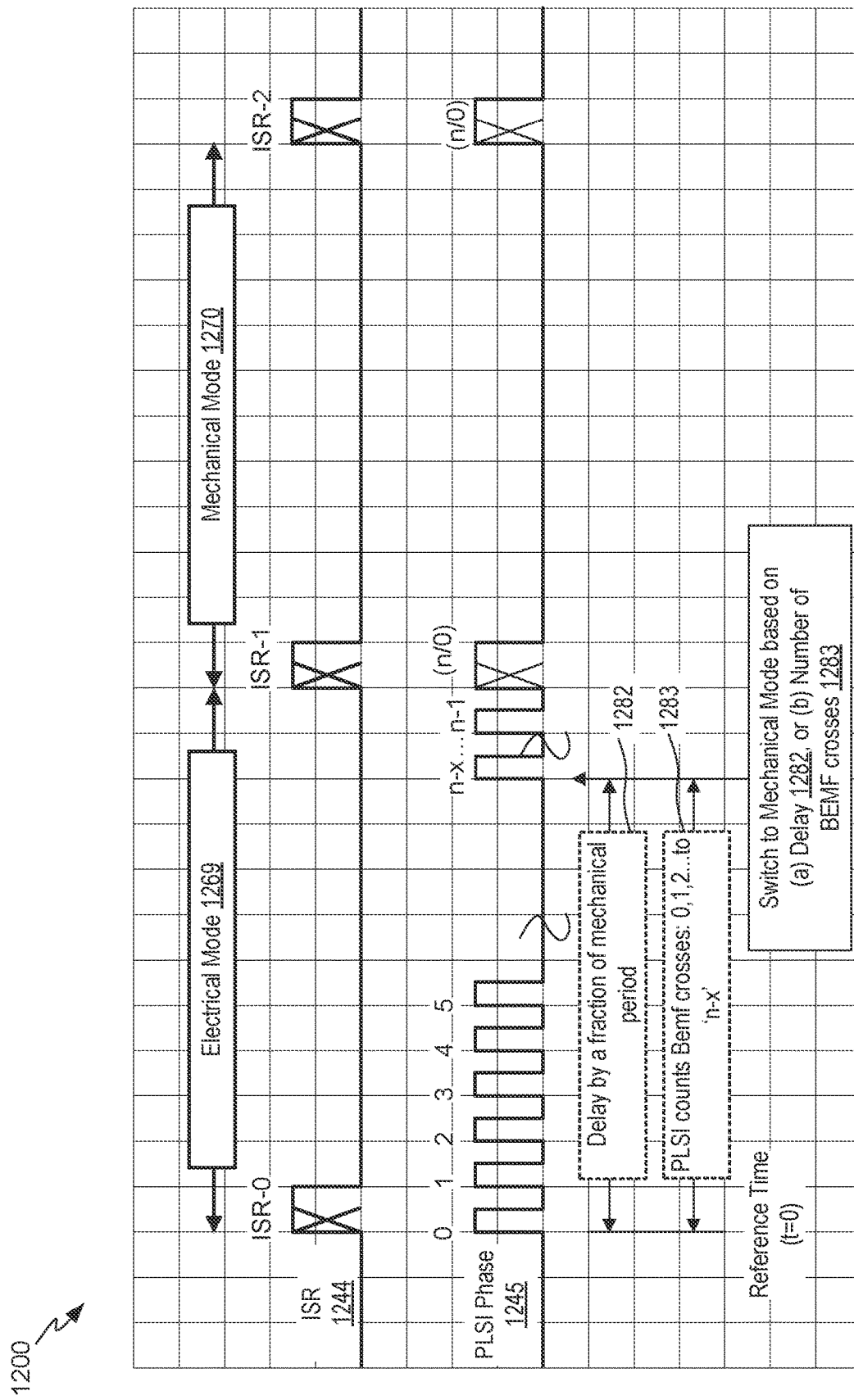
FIG. 12 illustrates a conceptual graph depicting a spindle motor switching synchronously from an electrical multi-phase mode to a mechanical mode, according to various aspects of the disclosure.

FIG. 12 illustrates a conceptual graph 1200 depicting a spindle motor switching synchronously from an electrical multi-phase mode 1269 to a mechanical mode 1270, according to various aspects of the disclosure. Conceptual graph 1200 depicts ISR 1244, where ISR 1244 includes a plurality of ISRs (e.g., ISR 0, ISR 1, ISR 2, etc.). In this example, the time span between adjacent ISRs corresponds to one mechanical revolution (e.g., shown as mechanical revolution period 837-a in FIG. 8A). Graph 1200 also depicts PLSI phase 1245. Initially, the spindle motor operates in the electrical multi-phase mode. In some cases, the electrical multi-phase mode comprises a plurality of BEMF windows/crosses (e.g., 'n' BEMF windows, where n=6, 8, etc.) for each electrical revolution. Since the spindle motor has multiple pole-pairs of magnets (e.g., six pole-pairs of magnets), the number of BEMF windows for every mechanical revolution can be calculated as the product of 'n' and the number of magnetic pole-pairs.

In some embodiments, the PLSI is commanded to switch from the electrical mode 1269 to the mechanical mode 1270 based on (1) calculating a delay time 1282, or (2) counting a number of BEMF crosses 1283. As previously noted, the delay time 1282 may be calculated as a fraction of the mechanical revolution period. In one non-limiting example, the delay time can be calculated as follows: [(number of pole-pairs−1)/(number of pole-pairs)]*[mechanical revolution period].

Alternatively, the PLSI may count the number of BEMF crosses as 0, 1, 2 . . . n−x, where (n−x)/n=[(number of pole-pairs−1)/(number of pole-pairs)]. For instance, if there are 36 BEMF windows for each mechanical revolution in the electrical multi-phase mode, the PLSI may switch to the mechanical mode when the number of BEMF crosses=⅚ *36=30 BEMF crosses. This helps ensure that the spindle interrupts (or ISRs) occur at the same BEMF cross (e.g., BEMF cross #0) regardless of the mode of operation of the spindle motor.

Figure 13A:
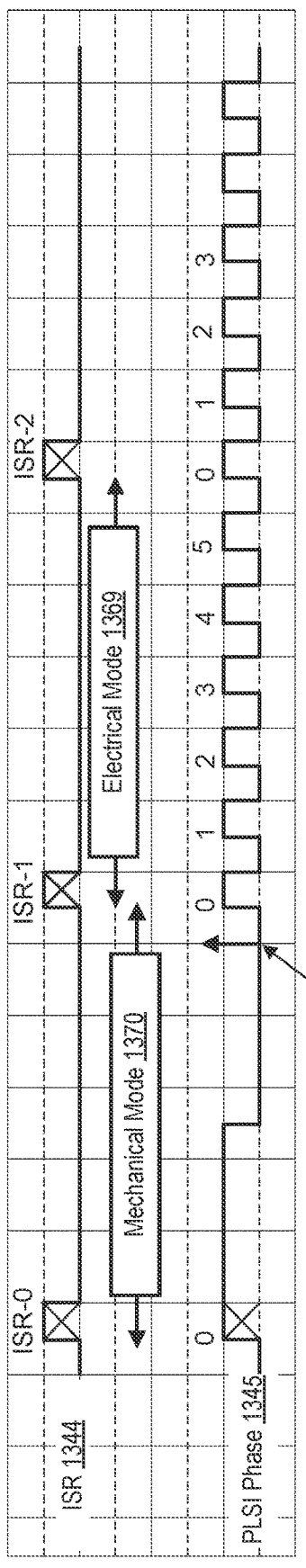
FIG. 13A illustrates a conceptual graph depicting a spindle motor switching synchronously from a mechanical mode to an electrical single-phase mode, according to various aspects of the disclosure.

FIG. 13A illustrates a conceptual graph 1300-a depicting a spindle motor switching synchronously from a mechanical mode 1370 to an electrical single-phase mode 1369, according to various aspects of the disclosure. Conceptual graph 1300-a depicts ISR 1344, where ISR 1344 includes a plurality of ISRs (e.g., ISR-0, ISR-1, ISR-2, etc.). Graph 1300-a also depicts PLSI phase 1345, where the rising edge of the PLSI phase 1345 coincides with the start of an ISR. In some cases, a delay timer is started at ISR-0. Additionally, as shown in FIG. 13A, the spindle motor mode Is switched from the mechanical mode 1370 to the electrical mode 1369. In the mechanical mode 1370, the SoC is configured to produce a spindle interrupt once for every rising edge of BEMF pulse. Prior to switching to the electrical mode 1369, the SoC is reprogrammed to produce a spindle interrupt once for every 'n' rising/falling BEMF pulses. In this example, the SoC is reprogrammed to produce a spindle interrupt once for every sixth rising BEMF pulse, since there are six electrical revolutions for every mechanical revolution in the electrical mode 1369. However, in other embodiments, the SoC may produce a spindle interrupt once for every fourth, eighth, twelfth, etc., rising BEMF pulses depending on the number of electrical revolutions for every mechanical revolution. As seen in FIG. 13A, after the spindle motor switches to the electrical mode 1369, each ISR (e.g., ISR-1, ISR-2) coincides with a BEMF cross #0.

Figure 13B:
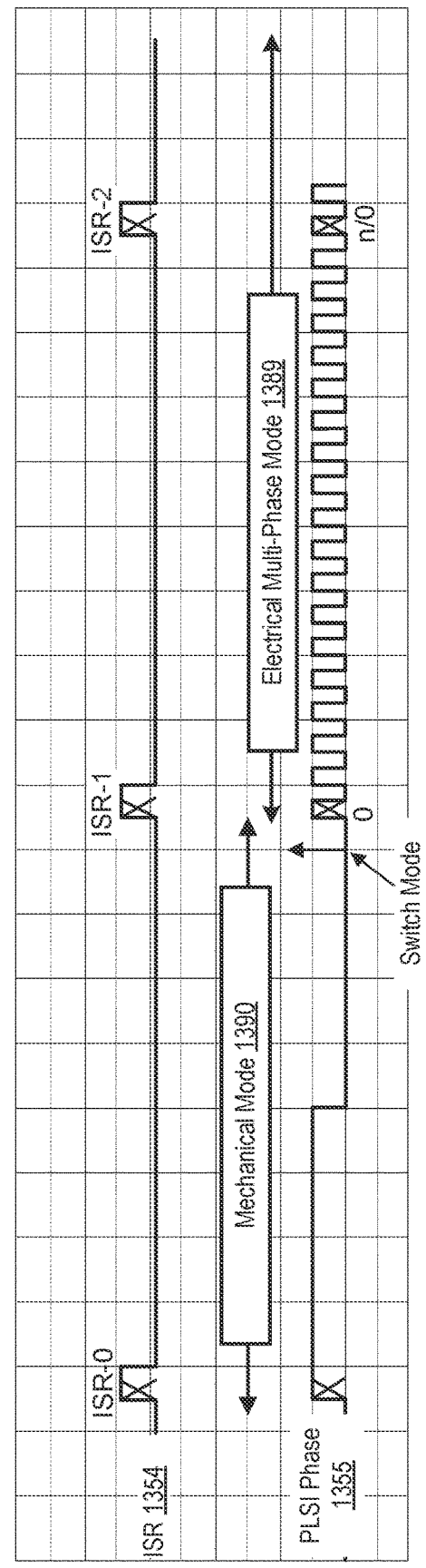
FIG. 13B illustrates a conceptual graph depicting a spindle motor switching synchronously from a mechanical mode to an electrical multi-phase mode, according to various aspects of the disclosure.

FIG. 13B illustrates a conceptual graph 1300-b depicting a spindle motor switching from a mechanical mode 1390 to an electrical multi-phase mode 1389, according to various aspects of the disclosure. Conceptual graph 1300-b depicts ISR 1354, where ISR 1354 includes a plurality of ISRs (e.g., ISR-0, ISR-1, ISR-2, etc.). Graph 1300-b also depicts PLSI phase 1355, where the rising edge of the PLSI phase 1355 coincides with the start of an ISR and/or a BEMF cross #0. Similar to FIG. 13A, a delay timer is started at ISR-0 to prepare the PLSI device to switch from the mechanical mode to the electrical multi-phase mode when the delay timer is equal to a pre-defined value (e.g., a particular fraction, such as $5/6^{th}$, of a mechanical revolution period). In the mechanical mode 1390, the SoC is configured to produce a spindle interrupt once for every rising edge of BEMF pulse. Prior to switching to the electrical multi-phase mode 1389, the SoC is reprogrammed to produce a spindle interrupt once for every 'n' rising/falling BEMF pulses, where 'n'=36, for instance. As seen in FIG. 13B, after the spindle motor switches from the mechanical mode 1390 to the electrical multi-phase mode 1389, each subsequent ISR (e.g., ISR-1, ISR-2) coincides with a BEMF cross #0.

Figure 14:
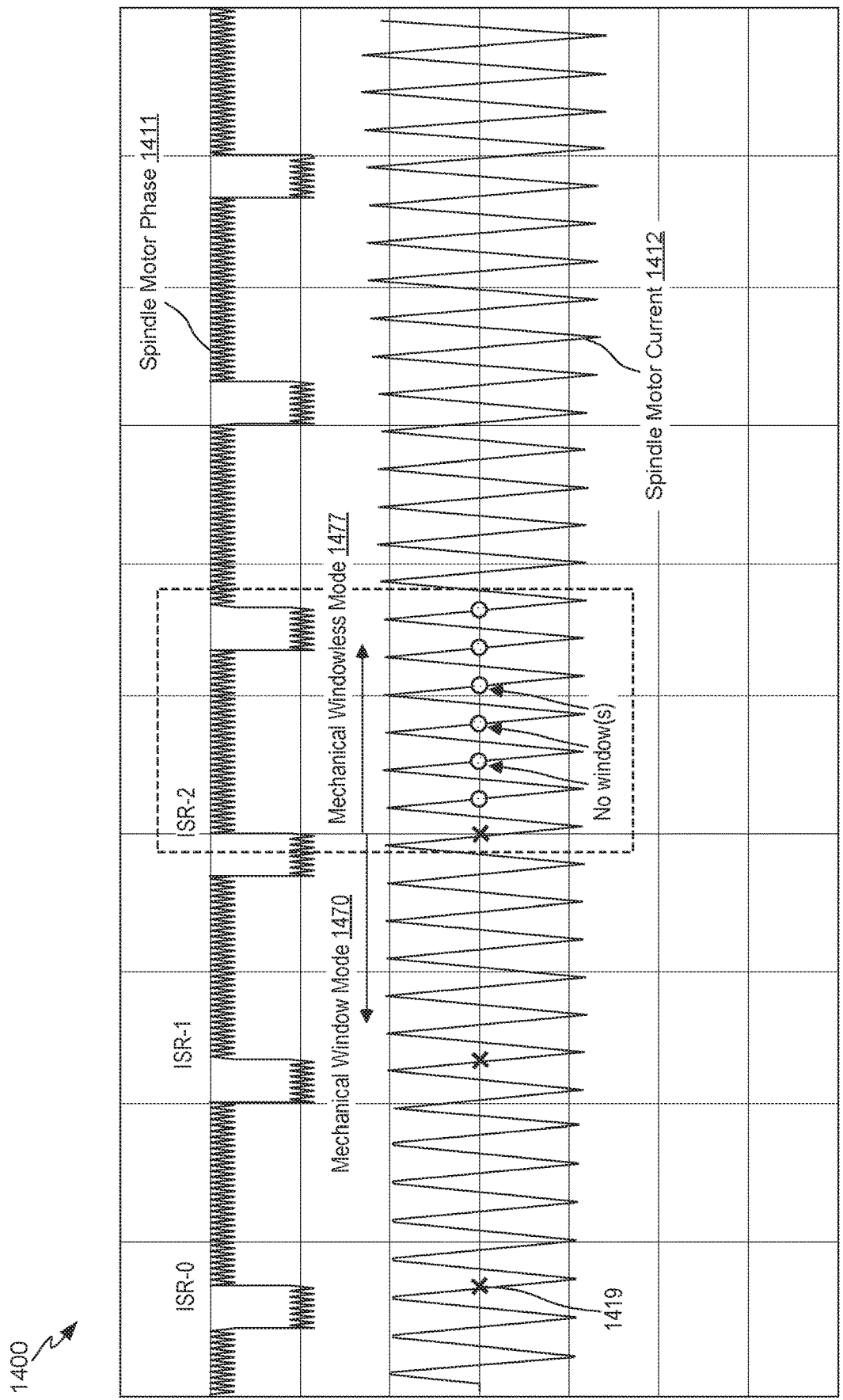
FIG. 14 illustrates a scope plot for a spindle motor switching from a mechanical window mode to a mechanical windowless mode, according to various aspects of the disclosure.

FIG. 14 illustrates a scope plot 1400 for a spindle motor switching from a mechanical window mode 1470 to a mechanical windowless mode 1477, according to various aspects of the disclosure. As seen, the scope plot 1400 shows a plurality of waveform traces, including one corresponding to a spindle motor phase 1411 and one corresponding to a spindle motor current 1412.

As seen, in the mechanical window mode 1470, there is 1 BEMF window/cross 1419 for every mechanical revolution. However, and as depicted in FIG. 14, there are no such windows in the mechanical windowless mode 1477. Similar to the other switch tasks described above (e.g., from mechanical mode to electrical single-phase mode), a delay timer can be implemented for switching the spindle motor from a current mode (i.e., mechanical window mode 1470) to a new mode (i.e., mechanical windowless mode 1477). In some cases, the delay timer may be initiated at a spindle motor ISR. Additionally, when the delay timer equals a pre-defined delay (e.g., $3/4^{th}$ of a mechanical revolution period, $5/6^{th}$ of a mechanical revolution period, to name two non-limiting examples), the PLSI is commanded to switch to the new mode. In this way, the start of the new mode (e.g., mechanical windowless mode 1477) coincides with the next ISR (i.e., the ISR after the one when the delay timer was started).

Figure 15:
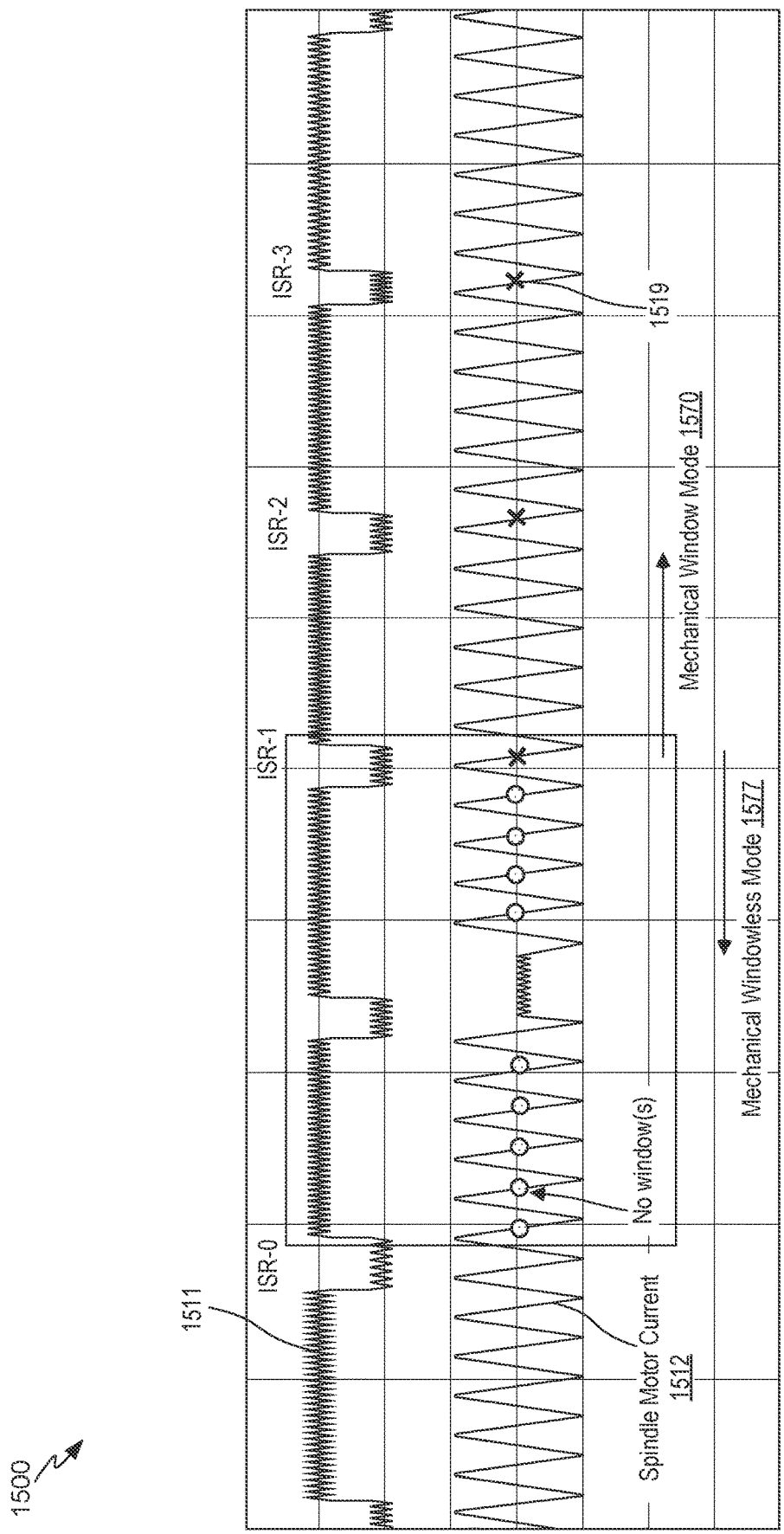
FIG. 15 illustrates a scope plot for a spindle motor switching from a mechanical windowless mode to a mechanical window mode, according to various aspects of the disclosure.

FIG. 15 illustrates a scope plot 1500 for a spindle motor switching from a mechanical windowless mode 1577 to a mechanical window mode 1570, according to various aspects of the disclosure. Scope plot 1500 shows the PLSI phase 1511 and spindle motor current 1512. Additionally, the spindle motor current 1512 trace depicts the lack of BEMF windows/crosses while the spindle motor is operating in the mechanical windowless mode 1577. The spindle motor current 1512 trace also depicts the presence of BEMF windows/crosses while the spindle motor is operating in the mechanical window mode 1570, as BEMF windows 1519. Similar to the other switch tasks described above (e.g., from mechanical mode to electrical single-phase mode), a delay timer can be implemented for switching the spindle motor from a current mode (i.e., mechanical windowless mode 1570) to a new mode (i.e., mechanical window mode 1570). In some cases, the delay timer may be initiated at a spindle motor ISR (i.e., initiated at a reference point, such as the mechanical index described in relation to FIG. 3). Additionally, when the delay timer equals a pre-defined delay (e.g., $3/4^{th}$ of a mechanical revolution period, $5/6^{th}$ of a mechanical revolution period, to name two non-limiting examples), the PLSI is commanded to switch to the new mode. In this way, the start of the new mode (e.g., mechanical window mode 1570) coincides with the next ISR (i.e., the ISR after the one when the delay timer was started).

Any suitable control circuitry (e.g., control circuitry 22 in FIG. 2A) may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one example, the read channel and data storage controller are implemented as separate integrated circuits, and in another example, they are fabricated into a single integrated circuit or system on a chip (SoC). In addition, the control circuitry 22 may include a preamp circuit implemented as a separate integrated circuit, integrated into the read channel or data storage controller circuit, or integrated into an SoC.

In some examples, the control circuitry, such as, but not limited to, control circuitry 22, comprises a microprocessor executing instructions, the instructions being operable to cause the microprocessor to perform the flow diagrams (e.g., shown in FIGS. 2C, 9, and/or 11) described herein. The instructions may be stored in any computer-readable medium. In some examples, they may be stored on a non-volatile semiconductor memory device, component, or system external to the microprocessor, or integrated with the microprocessor in a SoC. In some examples, the instructions are stored on the disk and read into a volatile semiconductor memory when the disk drive is powered on. In some examples, the control circuitry comprises suitable logic circuitry, such as state machine circuitry. In some examples, at least some of the flow diagram blocks may be implemented using analog circuitry (e.g., analog comparators, timers, etc.), and in other examples at least some of the blocks may be implemented using digital circuitry or a combination of analog and digital circuitry.

In various examples, one or more processing devices may comprise or constitute the control circuitry 22 as described herein, and/or may perform one or more of the functions of control circuitry as described herein. In various examples, the control circuitry 22, or other one or more processing devices performing one or more of the functions of control circuitry as described herein, may be abstracted away from being physically proximate to the disks and disk surfaces. The control circuitry, or other one or more processing devices performing one or more of the functions of control circuitry as described herein, may be part of or proximate to a rack of or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive, such as disk drive 15, may include a magnetic disk drive, an optical disk drive, a hybrid disk drive, or other types of disk drive. In addition, some examples may include electronic devices such as computing devices, data server devices, media content storage devices, or other devices, components, or systems that may comprise the storage media and/or control circuitry as described above.

The various features and processes described above may be used independently of one another or may be combined in various ways. All possible combinations and subcombinations are intended to fall within the scope of this disclosure. In addition, certain methods, events or process blocks may be omitted in some implementations. The methods and processes described herein (e.g., with reference to FIGS. 2C, 9, and/or 11) are also not limited to any particular sequence, and the blocks or states relating thereto can be performed in other sequences. For example, described tasks or events may be performed in an order other than that specifically disclosed, or multiple tasks or events may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the disclosure(s) disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method(s) 80, 900, and/or 1100, as well as other methods of this disclosure may include other steps or variations in various other embodiments. Some or all of any of method(s) 80, 900, and/or 1100 may be performed by or embodied in hardware (HW), firmware (FW), and/or performed or executed by a controller, a CPU, a field-programmable gate array (FPGA), a SoC, a multi-processor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method(s).

Data storage systems, devices, and methods are thus shown and described herein, in various foundational aspects and in various selected illustrative applications, architectures, techniques, and methods for maintaining the same (or substantially the same) motor location for spindle interrupts when the spindle motor switches mode for data storage, and other aspects of this disclosure. Persons skilled in the relevant fields of art will be well-equipped by this disclosure with an understanding and an informed reduction to practice of a wide panoply of further applications, architectures, techniques, and methods for maintaining the same (or substantially the same) motor location for spindle interrupts when the spindle motor switches mode for data storage, and other aspects of this disclosure encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:
1. A data storage device, comprising:
one or more disks;
a spindle motor for rotating the one or more disks, wherein the spindle motor comprises a plurality of magnetic pole-pairs, and wherein the spindle motor is configured to operate in a plurality of modes, including at least a first mode and a second mode; and
one or more processing devices configured to:
select a reference point for spindle motor interrupt service routines (ISRs);

determine a delay time, wherein the delay time is based at least in part on a number of magnetic pole-pairs and a mechanical revolution period of the spindle motor;
start a timer at a first ISR; and
when the timer is equal to the delay time, switch operation of the spindle motor from the first mode to the second mode.

2. The data storage device of claim 1, wherein the first ISR occurs at the reference point.

3. The data storage device of claim 2, wherein switching operation of the spindle motor from the first mode to the second mode comprises programming a power large scale integrated (PLSI) circuit to switch operation prior to a second, adjacent ISR.

4. The data storage device of claim 3, wherein a time span between spindle motor ISRs, including at least the first ISR and the second, adjacent ISR is equal to or substantially equal to the mechanical revolution period.

5. The data storage device of claim 1, wherein the delay time is a function of the number of magnetic pole-pairs of the spindle motor and the mechanical revolution period.

6. The data storage device of claim 1, wherein the reference point is selected to coincide with one magnetic pole-pair of the plurality of magnetic pole-pairs.

7. The data storage device of claim 1, wherein the first mode comprises one of a mechanical mode and an electrical mode, and wherein the second mode comprises another of the mechanical mode and the electrical mode, and wherein the mechanical mode is selected from a group consisting of a mechanical window mode and a mechanical windowless mode, and wherein the electrical mode is selected from a group consisting of an electrical single edge mode and an electrical multiple edge mode.

8. A data storage device, comprising:
one or more disks;
a spindle motor for rotating the one or more disks, wherein the spindle motor comprises a plurality of magnetic pole-pairs, each magnetic pole-pair corresponding to one electrical revolution, and wherein the spindle motor is configured to operate in a plurality of modes, including at least a first mode and a second mode, wherein the first mode is associated with a first number of back electromotive force (BEMF) windows for each spindle interrupt, and wherein the second mode is associated with a second number of BEMF windows for each spindle interrupt; and
one or more processing devices configured to:
select a reference point for spindle motor interrupt service routines (ISRs);
determine a target number of BEMF windows, wherein determining the target number of BEMF windows is based at least in part on one or more of the first number of BEMF windows and a number of magnetic pole-pairs;
start a counter at a first ISR;
increment, for each BEMF window detected, the counter; and
when the counter is equal to the target number of BEMF windows, switch operation of the spindle motor from the first mode to the second mode.

9. The data storage device of claim 8, wherein the first mode comprises one of a mechanical mode and an electrical mode, and wherein the second mode comprises another of the mechanical mode and the electrical mode, and wherein the electrical mode comprises one of an electrical single edge mode and an electrical multiple edge mode.

10. The data storage device of claim 8, wherein, when one of the first mode and the second mode comprises an electrical mode, each electrical revolution comprises one or more BEMF windows.

11. The data storage device of claim 8, wherein switching operation of the spindle motor from the first mode to the second mode further comprises:
generating a second ISR at the reference point;
determining the second number of BEMF windows for each spindle interrupt when the spindle motor is operating in the second mode; and
updating a System on Chip (SoC) to periodically generate one or more subsequent spindle motor ISRs, including at least a third ISR, wherein each of the one or more subsequent spindle motor ISRs is generated at or when the second number of BEMF windows have been crossed.

12. The data storage device of claim 11, wherein switching operation of the spindle motor from the first mode to the second mode comprises programming a power large scale integrated (PLSI) circuit to switch operation prior to the second ISR.

13. The data storage device of claim 11, wherein a time span between spindle motor ISRs, including at least a first time span between the first ISR and the second ISR, and the first time span between the second ISR and the third ISR is equal to or substantially equal to a mechanical revolution period.

14. The data storage device of claim 8, wherein the target number of BEMF windows=[(number of magnetic pole-pairs−1)*(number of BEMF windows for each electrical revolution)].

15. The data storage device of claim 8, wherein the reference point is selected to coincide with one magnetic pole-pair of the plurality of magnetic pole-pairs, and wherein each electrical revolution spans between two adjacent magnetic pole-pairs of the plurality of magnetic pole-pairs.

16. A method of operating a data storage device, comprising:
selecting a reference point for interrupt service routines (ISRs) for a spindle motor of the data storage device, wherein the spindle motor comprises a plurality of magnetic pole-pairs, and wherein the spindle motor is configured to operate in a plurality of modes, including at least a first mode and a second mode;
determining a delay time, wherein the delay time is based at least in part on a number of magnetic pole-pairs and a mechanical revolution period of the spindle motor;
starting a timer at a first ISR; and
when the timer is equal to the delay time, switching operation of the spindle motor from the first mode to the second mode.

17. The method of claim 16, wherein:
the first ISR occurs at the reference point;
switching operation of the spindle motor from the first mode to the second mode comprises programming a power large scale integrated (PLSI) circuit to switch operation prior to a second, adjacent ISR; and
a time span between spindle motor ISRs, including at least the first ISR and the second, adjacent ISR is equal to or substantially equal to the mechanical revolution period.

18. The method of claim 16, wherein the delay time is a function of the number of magnetic pole-pairs of the spindle motor and the mechanical revolution period, and wherein the reference point is selected to coincide with one magnetic pole-pair of the plurality of magnetic pole-pairs.

19. The method of claim 16, wherein the first mode comprises one of a mechanical mode and an electrical mode, and wherein the second mode comprises another of the mechanical mode and the electrical mode, and wherein the mechanical mode is selected from a group consisting of a mechanical window mode and a mechanical windowless mode, and wherein the electrical mode is selected from a group consisting of an electrical single edge mode and an electrical multiple edge mode.

20. A method of operating a data storage device, comprising:

selecting a reference point for interrupt service routines (ISRs) for a spindle motor of the data storage device, wherein the spindle motor comprises a plurality of magnetic pole-pairs, each magnetic pole-pair corresponding to one electrical revolution, and wherein the spindle motor is configured to operate in a plurality of modes, including at least a first mode and a second mode, wherein the first mode is associated with a first number of back electromotive force (BEMF) windows for each spindle interrupt, and wherein the second mode is associated with a second number of BEMF windows for each spindle interrupt;

determining a target number of BEMF windows, wherein determining the target number of BEMF windows is based at least in part on one or more of the first number of BEMF windows and a number of magnetic pole-pairs;

starting a counter at a first ISR;

incrementing, for each BEMF window detected, the counter; and when the counter is equal to the target number of BEMF windows, switching operation of the spindle motor from the first mode to the second mode.

21. The method of claim 20, wherein the first mode comprises one of a mechanical mode and an electrical mode, and wherein the second mode comprises another of the mechanical mode and the electrical mode, and wherein the electrical mode comprises one of an electrical single edge mode and an electrical multiple edge mode.

22. The method of claim 21, wherein, when one of the first mode and the second mode comprises an electrical mode, each electrical revolution comprises one or more BEMF windows.

* * * * *